(12) United States Patent
Lin et al.

(10) Patent No.: US 11,377,457 B2
(45) Date of Patent: Jul. 5, 2022

(54) 3,3,3',3'-TETRAMETHYL-1,1'-SPIROBIINDANE-BASED MONOPHOSPHINE LIGAND, INTERMEDIATES THEREOF, PREPARATION METHOD AND USE OF THE SAME

(71) Applicant: ZHEJIANG UNIVERSITY, Hangzhou (CN)

(72) Inventors: Xufeng Lin, Changzhou (CN); Huanyu Shan, Changzhou (CN); Qiaoxia Zhou, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/040,550

(22) PCT Filed: May 15, 2018

(86) PCT No.: PCT/CN2018/086893
§ 371 (c)(1),
(2) Date: Sep. 23, 2020

(87) PCT Pub. No.: WO2019/213987
PCT Pub. Date: Nov. 14, 2019

(65) Prior Publication Data
US 2021/0070789 A1 Mar. 11, 2021

(30) Foreign Application Priority Data
May 11, 2018 (CN) .......................... 2018 1 0453127

(51) Int. Cl.
*C07F 9/00* (2006.01)
*B01J 31/00* (2006.01)
(Continued)

(52) U.S. Cl.
CPC ....... *C07F 9/657154* (2013.01); *B01J 31/185* (2013.01)

(58) Field of Classification Search
CPC .......................... C07F 9/657154; B01J 31/185
See application file for complete search history.

(56) References Cited

FOREIGN PATENT DOCUMENTS

| CN | 1439643 A | | 9/2003 | |
|---|---|---|---|---|
| CN | 1887893 A | * | 1/2007 | ................ C07F 9/00 |

(Continued)

OTHER PUBLICATIONS

International Search Report (PCT/CN2018/086893); dated Feb. 21, 2019.
(Continued)

*Primary Examiner* — Sikarl A Witherspoon
(74) *Attorney, Agent, or Firm* — W&G Law Group

(57) ABSTRACT

Provided are a 3,3,3',3'-tetramethyl-1,1'-spirobiindane-based monophosphine ligand and intermediates thereof, and preparation methods and uses of the same. The monophosphine ligand is a compound represented by formula I or formula I', or an enantiomer, a raceme or a diastereoisomer thereof, including phosphonite ligands, phosphite ligands, phosphoramidite ester ligands, phosphoric acid and phosphonic amide. The monophosphine ligand is prepared with a known 3,3,3',3'-tetramethyl-1,1'-spirobiindane-7,7'-diol derivative as a raw material through a scheme in which the compound presented by formula II acts as an intermediate. The present disclosure provides a novel monophosphine ligand, which can be used as a ligand in a metal-catalysed organic reactions or in directly catalyzing an organic reaction, especially as a chiral monophosphine ligand widely used in many chiral catalytic reactions such as asymmetric addition, asymmetric hydrogenation, asymmetric coupling, and asymmetric allyl alkylation, having economic practicality and industrial application prospects.

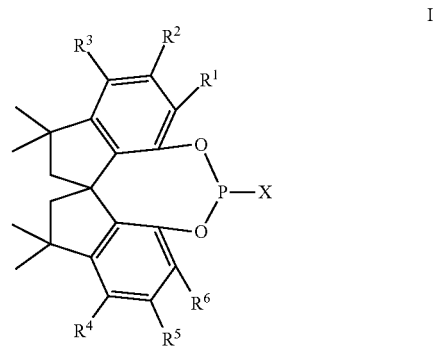

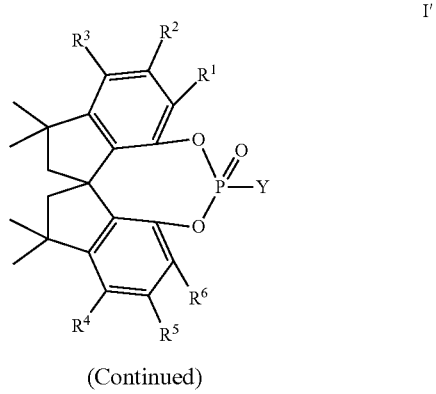

(Continued)

-continued

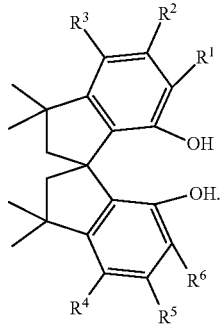

II

7 Claims, No Drawings

(51) Int. Cl.
*C07F 9/6571* (2006.01)
*B01J 31/18* (2006.01)

(56) References Cited

FOREIGN PATENT DOCUMENTS

| CN | 1887893 A | 1/2007 |
|---|---|---|
| CN | 102030780 A | 4/2011 |
| CN | 102516302 A | 6/2012 |

OTHER PUBLICATIONS

"SPINOL-Derived Phosphoric Acids: Synthesis and Application in Enantioselective Friedel-Crafts Reaction of Indoles with Imines" Xu Fangxi et al. [Nov. 17, 2010].

* cited by examiner

3,3,3',3'-TETRAMETHYL-1,1'-SPIROBIINDANE-BASED MONOPHOSPHINE LIGAND, INTERMEDIATES THEREOF, PREPARATION METHOD AND USE OF THE SAME

TECHNICAL FIELD

The invention relates to the technical field of organic chemistry, and relates to a novel 3,3,3',3'-tetramethyl-1,1'-spirobiindane-based monophosphine ligand, intermediates thereof, and a preparation method and a use of the same. Such a monophosphine ligand can be used in a metal-catalysed coupling reaction or an asymmetric reaction, or in directly catalyzing an organic reaction.

BACKGROUND

Asymmetric catalytic synthesis is one of the most intensive research areas in modern synthetic chemistry. This technique uses the most direct and effective chemical method for obtaining chiral molecules. It has advantages such as chiral proliferation, high enantio-selectivity, economy, and ease industrialization. It is challenging in the field of synthetic chemistry to perform efficient and highly selective asymmetric catalytic reactions, and the pivotal scientific issue thereof is to develop or discover new and efficient chiral ligands and their catalysts. Currently, the design and synthesis of chiral ligands have been advancing rapidly, many excellent chiral ligands or catalysts, as shown in the following structural formulas, have been synthesized, and quite a few of the chiral ligands have been applied in the industrial production. However, none of the chiral ligands can be used for all purposes due to the existing problems such as limited applications of the ligands and high dependence on reaction substrates. It is urgent for the asymmetric synthesis reactions to seek for chiral ligands having high efficacy and high selectivity.

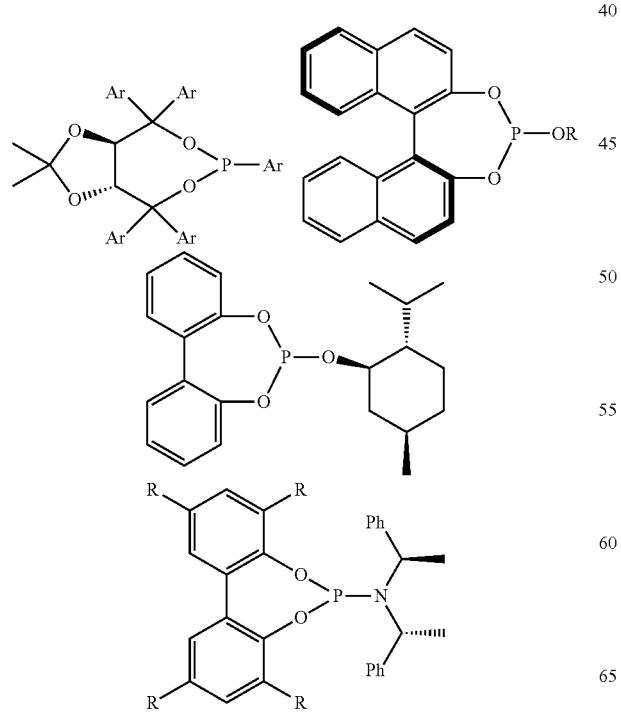

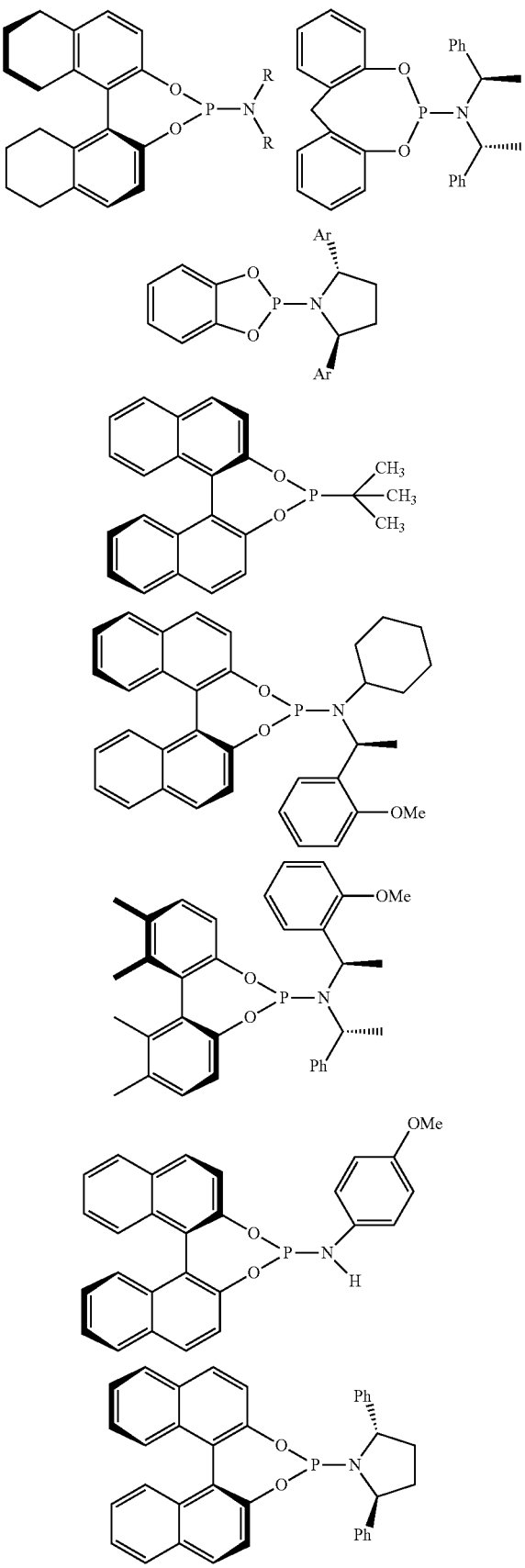

-continued
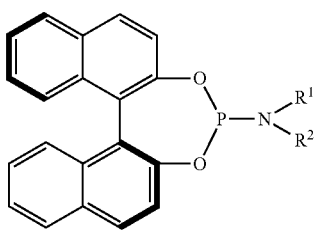
a R$^1$ = R$^2$ = Me
b R$^1$ = R$^2$ = Et
c R$^1$ = R$^2$ = i-Pr
d R$^1$ = Bn, R$^2$ = Me
e R$^1$ = Ph(Me)CH, R$^2$ = Me
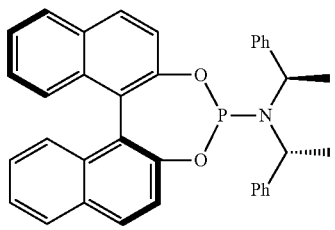
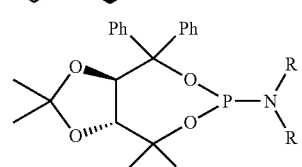
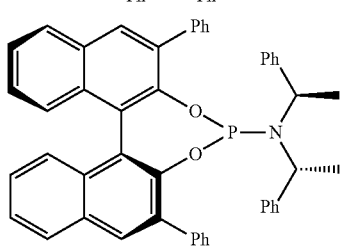
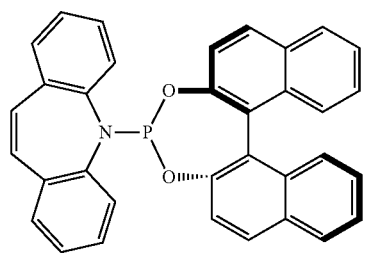
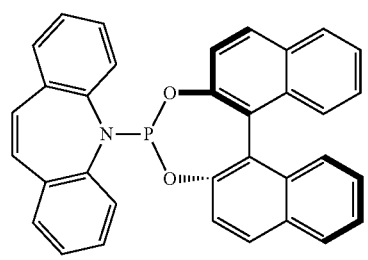
-continued
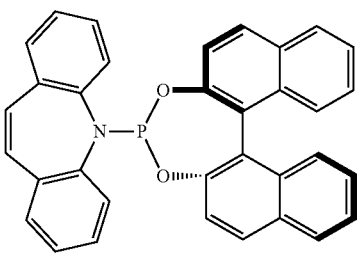
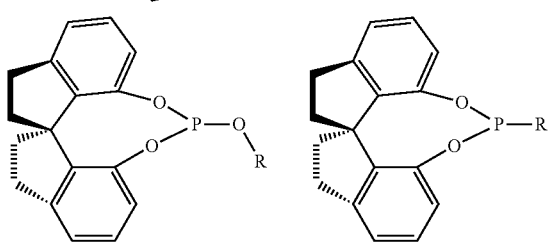
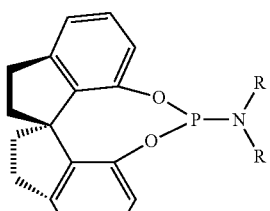
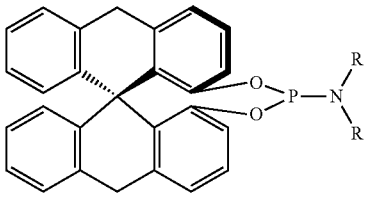
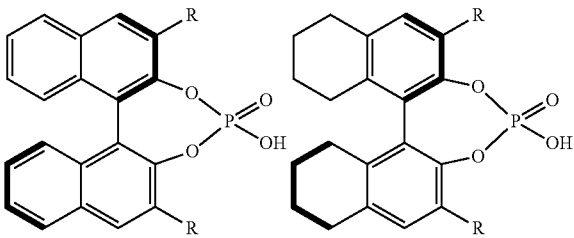
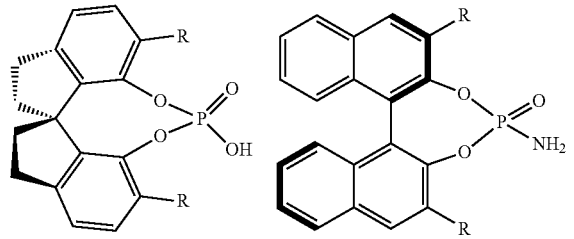
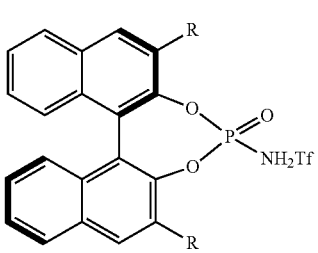

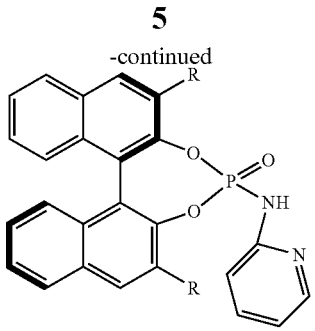

In 1999, Birman et al. synthesized racemic 1,1'-spirobiindane-7,7'-diol (SPINOL) through a six-step reaction starting from m-methoxybenzaldehyde, and obtained the corresponding optical enantiomer by chemical resolution (Tetrahedron: Asymmetry 1999, 10, 12), and it was pointed that the compound can be used for synthesizing a variety of chiral ligands. However, corresponding 3,3,3',3'-tetramethyl-1,1'-spirobiindane-7,7'-diol and its derivatives cannot be obtained according to this reaction scheme or other published methods. It was reported early in 1962 that 3,3,3',3'-tetramethyl-1,1'-spirobiindane-6,6'-diol (MSPINOL) can be obtained directly from industrialized bisphenol series products through acid catalysis with high yield in a one step, and subsequently, a modified large scale method and a chiral resolution method are known, see the following reaction scheme (*J. Chem. Soc.*, 1962, 415-418; *Org. Lett.*, 2004, 6, 2341-2343; US 2006/0020150; U.S. Pat. No. 4,879,421; *Bull. Chem. Soc. Japan*, 1977, 44, 496505); and based on this skeleton, we have successfully designed and synthesized 3,3,3',3'-tetramethyl-1,1'-spirobiindane-based phosphinooxazoline ligands (PCT/CN2018/071714), 3,3,3',3'-tetramethyl-1,1'-spirobiindane-based bis(oxazoline) ligands (PCT/CN2017/119944), and 3,3,3',3'-tetramethyl-1,1'-spirobiindane-based phosphine ligands (PCT/CN2017/116105).

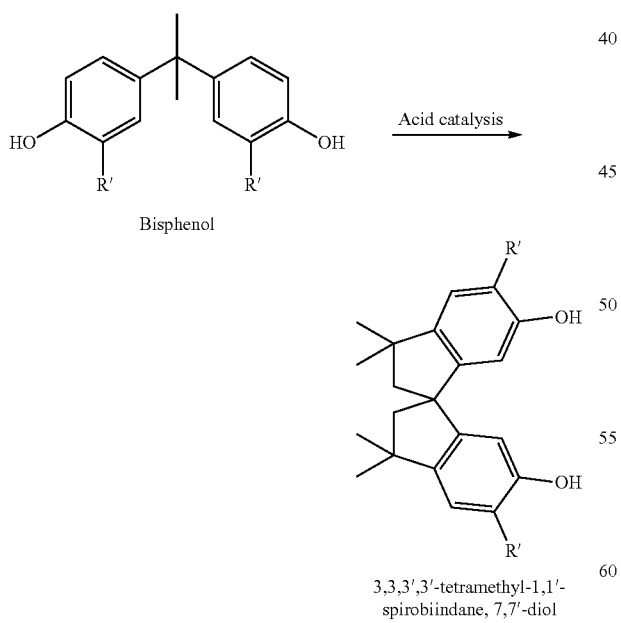

The present invention intends to design and prepare corresponding 3,3,3',3'-tetramethyl-1,1'-spirobiindane-based monophosphine ligands, including phosphonite ligands, phosphite ligands, phosphoramidite ester ligands, phosphoric acid and phsophonamidate, using inexpensive and easily available 3,3,3',3'-tetramethyl-1,1'-spirobiindane-6,6'-diol. Compared to the 7,7'-spirobiindane-based monophosphine ligands, such ligands have no active arylmethylene on the spiro ring skeleton, the 3,3,3',3'-tetramethyl-1,1'-spirobiindane skeleton is more stable and stronger, the raw materials are cheap and abundant, the synthesis reaction scheme is shorter, the preparation cost is low, and the practicability is better, and the ligand library can be modified and expanded more easily, which will greatly enrich the phosphine ligand derivatives. In addition, derivative ligands based on such ligands have different dihedral angles, indicating different catalytic effects or uses.

SUMMARY

Purposes of the present invention are to provide a 3,3,3',3'-tetramethyl-1,1'-spirobiindane-based monophosphine ligand compound and intermediates thereof, and preparation methods and uses of the same.

A 3,3,3',3'-tetramethyl-1,1'-spirobiindane-based monophosphine ligand, being a compound represented by formula I or formula I', or an enantiomer, a raceme or a diastereoisomer thereof:

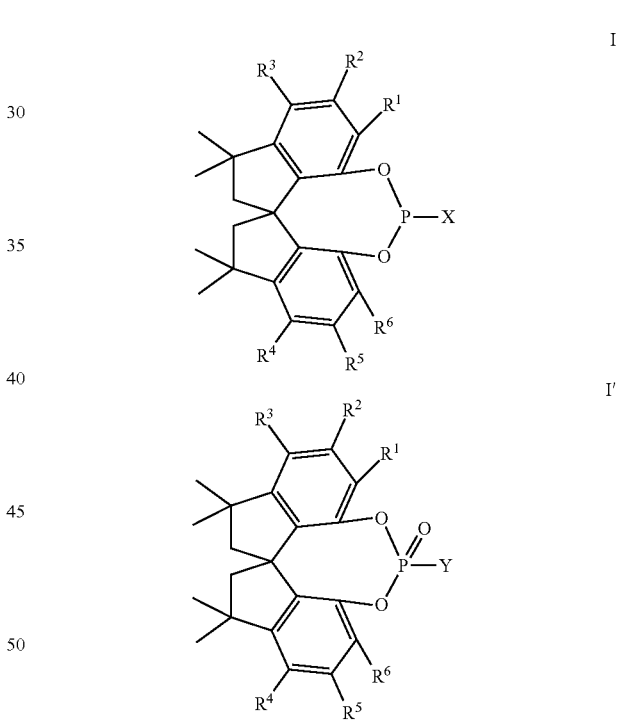

in formula I or formula I': $R^1$ and $R^6$ are each independently selected from the group consisting of hydrogen. $C_1$-$C_{10}$ alkyl or perfluoroalkyl, $C_3$-$C_6$ cycloalkyl, $C_1$-$C_4$ alkoxy or perfluoroalkoxy, unsubstituted or substituted aryloxy, unsubstituted or substituted heteroaryloxy, unsubstituted or substituted arylmethyleneoxy, unsubstituted or substituted heteroarylmethyleneoxy, unsubstituted or substituted aryl, and unsubstituted or substituted heteroaryl; and $R^2$, $R^3$, $R^4$, and $R^5$ are each independently selected from the group consisting of hydrogen, halogen, $C_1$-$C_{10}$ alkyl or perfluoroalkyl, $C_3$-$C_6$ cycloalkyl, $C_1$-$C_4$ alkoxy or perfluoroalkoxy, unsubstituted or substituted aryloxy, unsubstituted or substituted aryl, and unsubstituted or substituted heteroaryl, wherein the substituted aryloxy, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, aryloxy, and heteroaryl, and the heteroaryl is $C_5$-$C_{14}$ heteroaryl;

in formula I: X is selected from the group consisting of $C_1$-$C_{10}$ alkyl or perfluoroalkyl, $C_3$-$C_6$ cycloalkyl, unsubstituted or substituted arylmethylene, unsubstituted or substituted aryl, unsubstituted or substituted heteroaryl, unsubstituted or substituted arylvinylphenyl, $C_1$-$C_{10}$ alkoxy or perfluoroalkoxy, $C_1$-$C_{10}$ unsubstituted or substituted cycloalkoxy, unsubstituted or substituted aryloxy, unsubstituted or substituted heteroaryloxy, unsubstituted or substituted arylmethyleneoxy, unsubstituted or substituted heteroarylmethyleneoxy, unsubstituted or substituted arylvinylphenoxy, substituted propoxy, $R^8SO_2NR^7$, and $NR^7R^8$, wherein the substituted aryloxy, the substituted propoxy, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, aryloxy, heteroaryl, and substituted carbamido, and the heteroaryl is $C_5$-$C_{14}$ heteroaryl; $R^1$ and $R^8$ are each independently selected from the group consisting of hydrogen, $C_1$-$C_4$ alkyl, unsubstituted or substituted cycloalkyl, unsubstituted or substituted aryl, unsubstituted or substituted heteroaryl, unsubstituted or substituted arylmethylene, unsubstituted or substituted arylmethylmethenyl, substituted diarylmethenyl, and unsubstituted or substituted arylvinylmethenyl, and $R^7$ and $R^8$ are capable of forming 2-methylenealkoxypyrrolidinyl, 2,5-diarylpyrrolidinyl or 2,5-di(substituted aryl)pyrrolidinyl, or a $C_3$-$C_{14}$ ring or substituted benzoaliphatic ring, wherein the substituted cycloalkyl, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, benzyl, aryloxy, and substituted carbamido;

in formula I': Y is selected from the group consisting of hydrogen, hydroxyl or $NHR^9$; $R^9$ is selected from the group consisting of hydrogen, $C_1$-$C_4$ alkyl, unsubstituted or substituted cycloalkyl, unsubstituted or substituted aryl, unsubstituted or substituted heteroaryl, unsubstituted or substituted arylmethylene, unsubstituted or substituted arylmethylmethenyl, substituted diarylmethenyl, $C_1$-$C_{18}$ alkyl or perfluoroalkylsulfonyl, and arylsulfonyl or substituted arylsulfonyl, wherein the substituted cycloalkyl, the substituted arylsulfonyl, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, benzyl, aryloxy, and substituted carbamido.

The 3,3,3',3'-tetramethyl-1,1'-spirobiindane-based monophosphine ligand can be a phosphonite ligand represented by formula I-A or an enantiomer thereof:

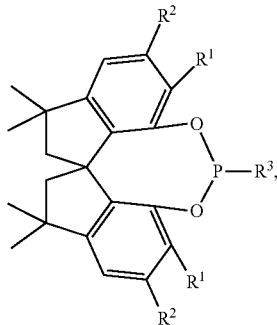

I-A in the formula: $R^1$ is selected from the group consisting of hydrogen, $C_1$-$C_{10}$ alkyl or perfluoroalkyl, $C_3$-$C_6$ cycloalkyl, $C_1$-$C_4$ alkoxy or perfluoroalkoxy, unsubstituted or substituted aryloxy, unsubstituted or substituted heteroaryloxy, unsubstituted or substituted arylmethyleneoxy, unsubstituted or substituted heteroarylmethyleneoxy, unsubstituted or substituted aryl, and unsubstituted or substituted heteroaryl; $R^2$ is hydrogen or $C_1$-$C_4$ alkyl; and $R^3$ is selected from the group consisting of $C_1$-$C_{10}$ alkyl or perfluoroalkyl, $C_3$-$C_6$ cycloalkyl, unsubstituted or substituted aryl, unsubstituted or substituted arylvinylphenyl, unsubstituted or substituted heteroaryl, wherein the substituted aryloxy, the substituted arylvinylphenyl, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, aryloxy, and heteroaryl, and the heteroaryl is $C_5$-$C_{14}$ heteroaryl.

The 3,3,3',3'-tetramethyl-1,1'-spirobiindane-based monophosphine ligand can also be a phosphite ligand represented by formula I-B or an enantiomer thereof:

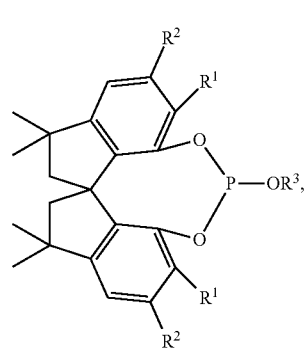

I-B in the formula: $R^1$ is selected from the group consisting of hydrogen, $C_1$-$C_{10}$ alkyl or perfluoroalkyl, $C_3$-$C_6$ cycloalkyl, $C_1$-$C_4$ alkoxy or perfluoroalkoxy, unsubstituted or substituted aryloxy, unsubstituted or substituted heteroaryloxy, unsubstituted or substituted arylmethyleneoxy, unsubstituted or substituted heteroarylmethyleneoxy, unsubstituted or substituted aryl, unsubstituted or substituted heteroaryl; $R^2$ is hydrogen or $C_1$-$C_4$ alkyl; and $R^3$ is selected from the group consisting of $C_1$-$C_{10}$ alkyl or perfluoroalkyl, $C_3$-$C_6$ cycloalkyl, unsubstituted or substituted aryl, unsubstituted or substituted heteroaryl, wherein the substituted aryloxy, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, aryloxy, and heteroaryl, and the heteroaryl is $C_5$-$C_{14}$ heteroaryl;

$R^3$ may be represented by structural formula I-BB:

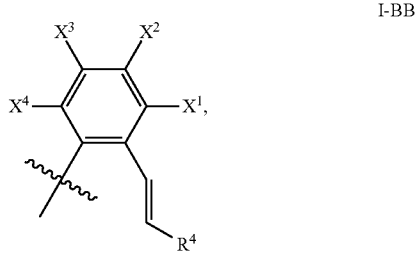

I-BB in formula I-BB: $X^1$-$X^4$ is selected from the group consisting of hydrogen, $C_1$-$C_{10}$ alkyl or perfluoroalkyl, $C_3$-$C_6$ cycloalkyl, $C_1$-$C_4$ alkoxy or perfluoroalkoxy, unsubstituted or substituted aryloxy, unsubstituted or substituted heteroaryloxy, unsubstituted or substituted arylmethyleneoxy, unsubstituted or substituted heteroarylmethyleneoxy, unsubstituted or substituted aryl, unsubstituted or substituted heteroaryl; $R^4$ is selected from the group consisting of unsubstituted or substituted aryl, and unsubstituted or substituted heteroaryl, wherein the substituted aryloxy, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, aryloxy, and heteroaryl, and the heteroaryl is $C_5$-$C_{14}$ heteroaryl.

The 3,3,3',3'-tetramethyl-1,1'-spirobiindane-based monophosphine ligand may be a phosphite ligand represented by formula I-C or an enantiomer thereof:

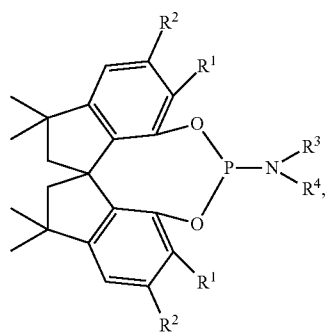

I-C in the formula: $R^1$ is selected from the group consisting of hydrogen, $C_1$-$C_{10}$ alkyl or perfluoroalkyl, $C_3$-$C_6$ cycloalkyl, $C_1$-$C_4$ alkoxy or perfluoroalkoxy, unsubstituted or substituted aryloxy, unsubstituted or substituted heteroaryloxy, unsubstituted or substituted arylmethyleneoxy, unsubstituted or substituted heteroarylmethyleneoxy, unsubstituted or substituted aryl, and unsubstituted or substituted heteroaryl;

$R^2$ is hydrogen or $C_1$-$C_4$ alkyl;

$R^3$ and $R^4$ are each independently selected from the group consisting of hydrogen, $C_1$-$C_4$ alkyl, unsubstituted or substituted cycloalkyl, unsubstituted or substituted aryl, unsubstituted or substituted heteroaryl, unsubstituted or substituted arylmethylene, unsubstituted or substituted arylmethylmethenyl, substituted diarylmethenyl, and unsubstituted or substituted arylvinylmethenyl, and $R^3$ and $R^4$ are capable of forming 2-methylenealkoxypyrrolidinyl, 2,5-diarylpyrrolidinyl or 2,5-di(substituted aryl)pyrrolidinyl, or a $C_3$-$C_{10}$ ring or substituted benzoaliphatic ring, wherein the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, and aryloxy.

An intermediate compound for preparing the 3,3,3',3'-tetramethyl-1,1'-spirobiindane-based monophosphine ligand is a compound represented by formula II or an enantiomer thereof:

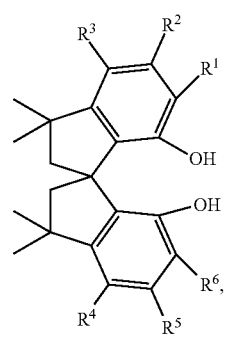

II in the formula: $R^1$ and $R^6$ are each independently selected from the group consisting of hydrogen, $C_1$-$C_{10}$ alkyl or perfluoroalkyl, $C_3$-$C_6$ cycloalkyl, $C_1$-$C_4$ alkoxy or perfluoroalkoxy, unsubstituted or substituted aryloxy, unsubstituted or substituted heteroaryloxy, unsubstituted or substituted arylmethyleneoxy, unsubstituted or substituted heteroarylmethyleneoxy, unsubstituted or substituted aryl, and unsubstituted or substituted heteroaryl; and $R^2$, $R^3$, $R^4$, and $R^5$ are each independently selected from the group consisting of hydrogen, halogen, $C_1$-$C_{10}$ alkyl or perfluoroalkyl, $C_3$-$C_6$ cycloalkyl, $C_1$-$C_4$ alkoxy or perfluoroalkoxy, unsubstituted or substituted aryloxy, unsubstituted or substituted heteroaryloxy, unsubstituted or substituted aryl, and unsubstituted or substituted heteroaryl, wherein the substituted aryloxy, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, aryloxy, and heteroaryl, and the heteroaryl is $C_5$-$C_{14}$ heteroaryl.

A synthesis method of the intermediate represented by formula II includes: subjecting a racemic or chiral 3,3,3',3'-tetramethyl-1,1'-spirobiindane-7,7'-diol (formula III) as a starting material to a Baeyer-Villiger oxidation rearrangement reaction and an alkaline hydrolysis reaction to obtain a compound represented by formula II.

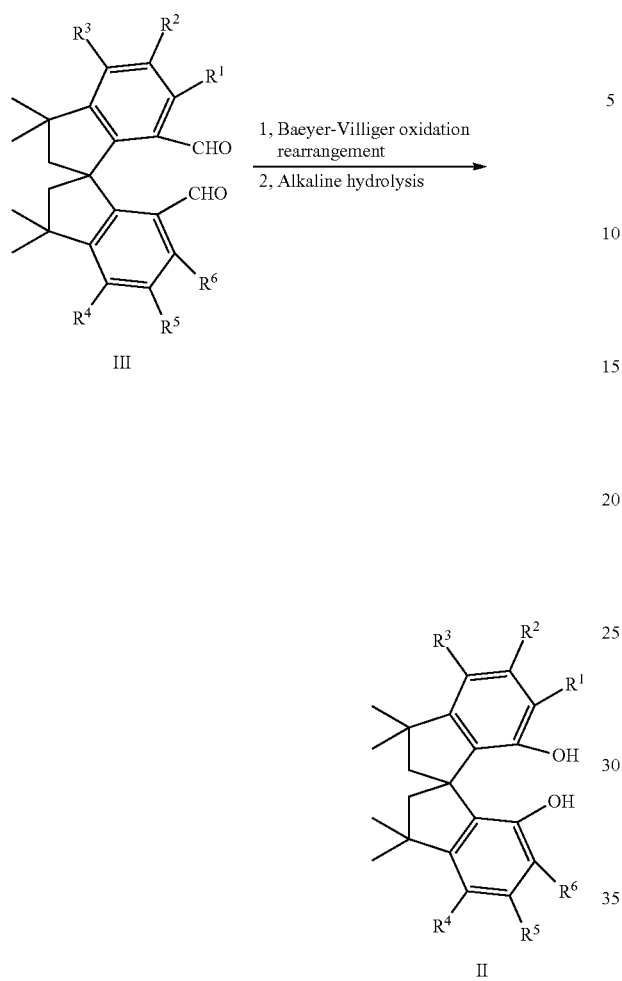

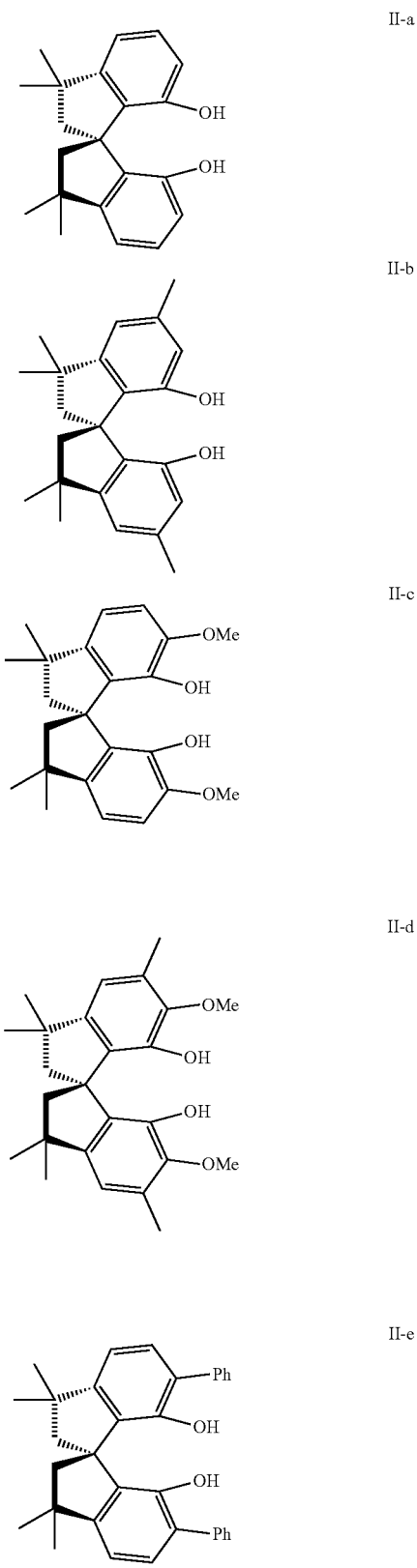

The compound represented by formula II may be any of the following compounds, or an enantiomer or a raceme thereof:

the Baeyer-Villiger oxidation rearrangement reaction can be conducted by using dichloromethane or dichloroethane as a solvent, using acetic acid, trifluoroacetic acid or a mixed acid thereof (the amount of acid is 2-4 times the amount of the compound of formula III) as a catalyst, and using a peroxyacid, for example, peroxyacetic acid, peroxytrifluoroacetic acid, peroxybenzoic acid, or 3-chloroperoxybenzoic acid (the amount of peroxyacid is 2-5 times the amount of the compound of formula III) as an oxidant, at 0°-35° for 12-24 hours, and the reaction product can be hydrolysed in a mixed solvent of methanol or ethanol in a mixed solvent containing potassium hydroxide or sodium hydroxide (the amount of sodium hydroxide or potassium hydroxide is 3-15 times the amount of the compound of formula II or formula III in mole) at a temperature from room temperature to −50° C. for 12-24 hours, and finally acidified to obtain the compound of formula II. The starting material 3,3,3',3'-tetramethyl-1,1'-spirobiindane-7,7'-diol (formula III) can be prepared by referring to the literature method (PCT/CN2017/119944, 3,3,3',3'-tetramethyl-1,1'-spirobiindane-based bisoxazoline ligand compound), and various chiral and racemic 3,3,3',3'-tetramethyl-1,1'-spirobiindane-7,7'-diol derivatives can be successfully synthesized by the method disclosed in the patent application.

II-f 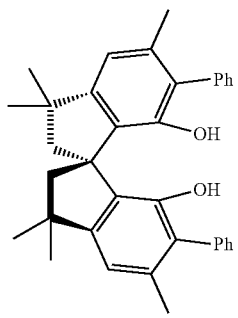

II-g 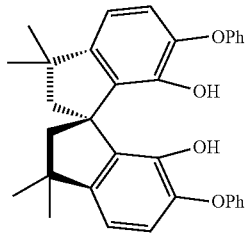

II-h 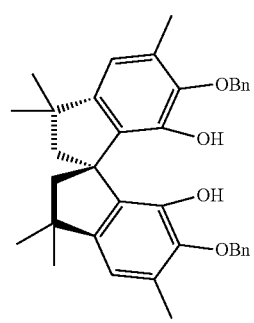

II-i 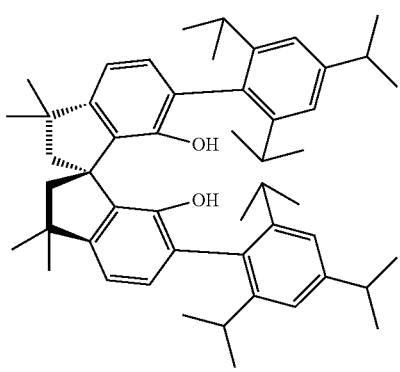

II-j 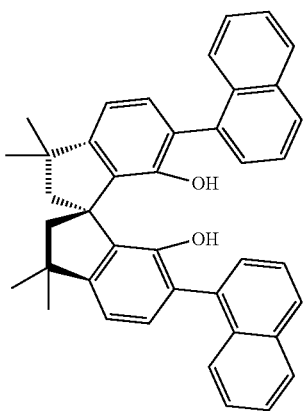

II-k 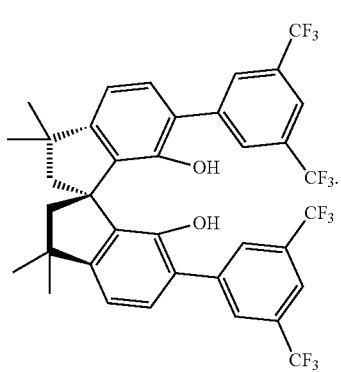

A synthetic method of the compound represented by formula I incudes: preparing a compound represented by formula I through a substitution reaction of a compound presented by formula II, as a raw material, with substituted phosphoric dichloride $Cl_2P$—X under an alkali, according to the following reaction scheme:

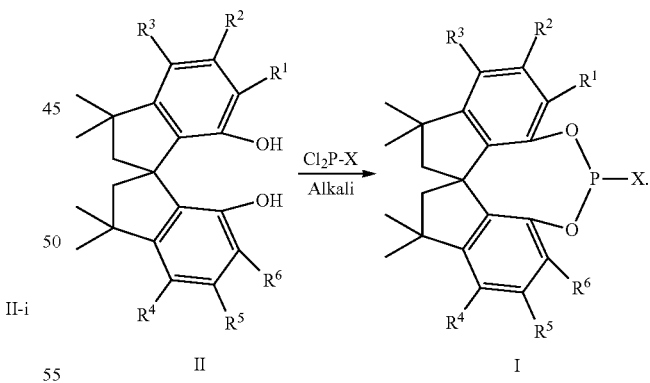

The substitution reaction is conducted under the conditions: triethylamine, tributylamine, diisopropyl ethylamine, sodium hydride or butyllithium is used as the alkali (in an amount of 2-10 times the amount of the compound of formula II in mole), the amount of phosphoric dichloride $Cl_2P$—X is 1-1.5 times the amount of the compound of formula II in mole, tetrahydrofuran, dichloromethane, dichloroethane, toluene, acetonitrile, dioxane, N, or N-dimethylformamide is used as the reaction solvent, and the reaction was conducted at room temperature with stirring for 1-12 h to obtain the compound of formula I; in the formula, R1-R6 are as defined for the compound of formula I, X is selected from the group consisting of $C_1$-$C_{10}$ alkyl or perfluoroalkyl, $C_3$-$C_6$ cycloalkyl, unsubstituted or substituted arylmethylene, unsubstituted or substituted aryl, unsubstituted or substituted heteroaryl, unsubstituted or substituted arylvinylphenyl, and $NR^7R^8$, wherein the substituted aryloxy, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, aryloxy, and heteroaryl, and the heteroaryl is $C_5$-$C_{14}$ heteroaryl; and $R^7$ and $R^8$ are as defined the compound of formula I.

Alternatively, the synthesis method includes: preparing a compound represented by formula II-I through a substitution reaction of the compound represented by formula II, as a raw material, with phosphorus trichloride under an alkali, and then preparing the compound represented by formula I through a reaction of the compound represented by formula II-I with HX and an alkali, according to the following reaction scheme:

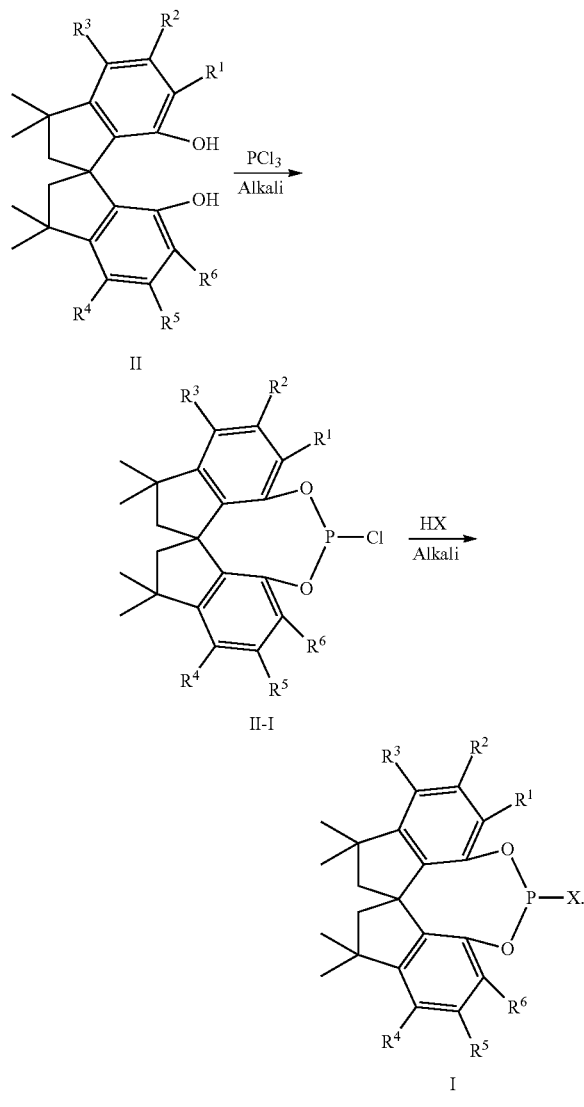

The compound of formula II-I is prepared under the conditions: triethylamine, tributylamine, or diisopropyl ethylamine is used as the alkali (in an amount of 2-4 times of the amount of the compound of formula II in mole), the amount of phosphorus trichloride $PCl_3$ is equal to the amount of the compound of formula II in mole, tetrahydrofuran, dichloromethane, dichloroethane, toluene, acetonitrile, diethyl ether or dioxane is used as a reaction solvent, and the reaction was conducted at a temperature from −78° C. to room temperature for 0.5-2 h to obtain the compound of formula II-I or a solution thereof; the compound of formula I is prepared under the conditions: tetrahydrofuran, dichloromethane, dichloroethane, toluene, acetonitrile, diethyl ether or dioxane is used as a reaction solvent, HX and butyllithium or sodium hydride (the amount of butyllithium or sodium hydride is 1-1.2 times the amount of HX in mole) reacts at a temperature from −30° C. to room temperature for 0.5-1 h to obtain a reactant of HX and the alkali, which is then mixed and reacts with the compound of formula II-I or the solution thereof (the amount of HX is 1-1.5 times the amount of the compound of formula II-I in mole) at a temperature from −78° C. to room temperature with stirring for 6-12 h to obtain the compound of formula I;

In the formulas, $R^1$-$R^6$ are as defined for the compound of formula I, X is selected from the group consisting of $C_1$-$C_{10}$ alkoxy or perfluoroalkoxy, $C_1$-$C_{10}$ unsubstituted or substituted cycloalkoxy, unsubstituted or substituted aryloxy, unsubstituted or substituted heteroaryloxy, unsubstituted or substituted arylmethyleneoxy, unsubstituted or substituted heteroarylmethyleneoxy, unsubstituted or substituted arylvinylphenoxy, and $NR^7R^8$, wherein the substituted aryloxy, the substituted aryl or the substituted heteroaryl has one or more substituents each independently selected from the group consisting of halogen, N-dimethylamino, $C_1$-$C_4$ alkyl or perfluoroalkyl, $C_3$-$C_6$ cycloalkyl, $C_1$-$C_4$ alkoxy or perfluoroalkoxy, methylenedioxy, aryl, aryloxy, and heteroaryl, and the heteroaryl is $C_5$-$C_{14}$ heteroaryl; and $R^7$ and $R^8$ are as defined for the compound of formula I.

A synthesis method of the compound of formula I' include: preparing a compound represented by formula I' through a substitution reaction of a compound represented by II, as a raw material, with a compound represented by II as a raw material under an alkali, and then hydrolysis, according to the following reaction scheme:

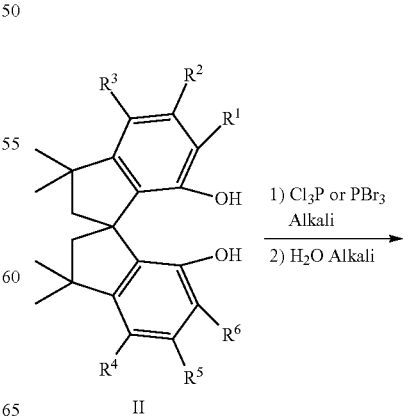

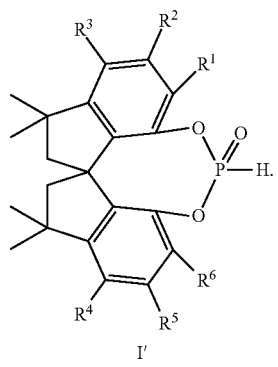

I'

In the formulas: $R^1$-$R^6$ are as defined for the compound of formula I'.

Alternatively, the synthesis method of the compound of formula I' include: preparing a compound represented by formula II-I' through a substitution reaction of the compound presented by formula II, as a raw material, with phosphorus oxychloride, and then preparing the compound represented by formula I' through a hydrolysis of the compound represented by formula II-I', according to the following reaction scheme:

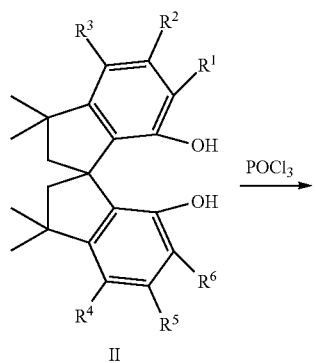

II

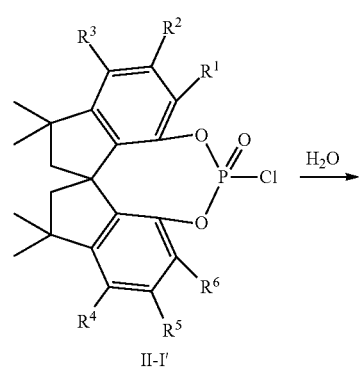

II-I'

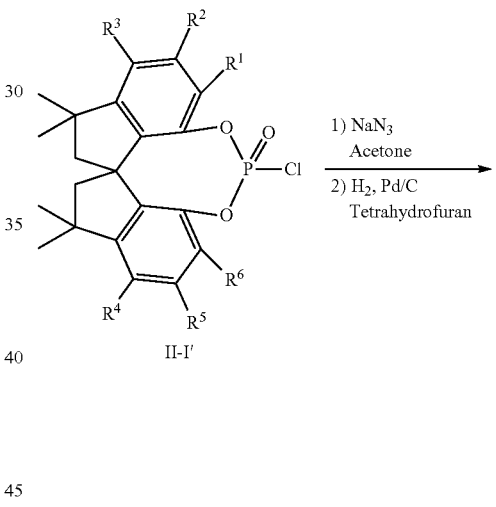

I'

In the formulas: $R^1$-$R^6$ are as defined for the compound of formula I'.

Alternatively, the synthesis method of the compound of formula I' include: preparing the compound represented by formula I' through a substitution reaction and a reduction reaction of the compound represented by formula II-I' with sodium azide, according to the following reaction scheme:

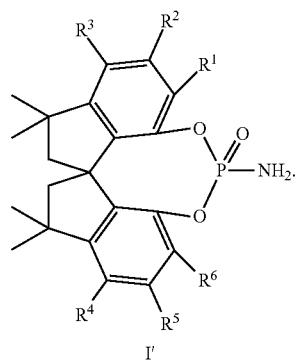

I'

Alternatively, the synthesis method of the compound of formula I' include: preparing the compound represented by formula I' through a substitution reaction of the compound represented by formula II-I' with $R^9NH_2$ under an alkali, according to the following reaction scheme:

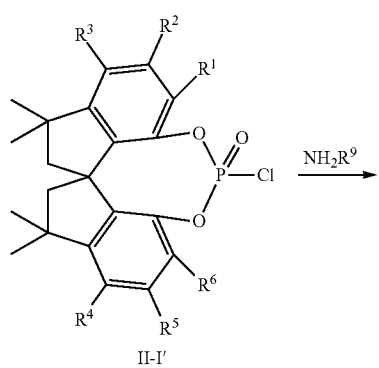
II-I'
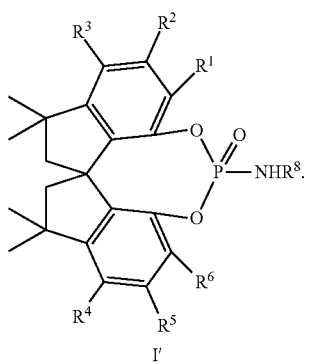
I'
In the formula, $R^1$-$R^6$ and $R^9$ are as defined for the compound of formula I'.
As the 3,3,3',3'-tetramethyl-1,1'-spirobiindane-based monophosphine ligand according to the present disclosure, the compound represented by formula I may be any one of the following compounds, or an enantiomer or a raceme thereof:
I-1
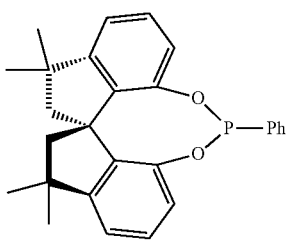
I-2
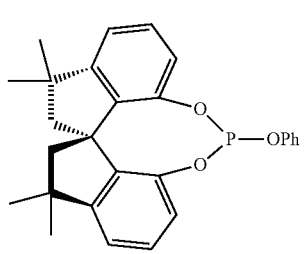
I-3
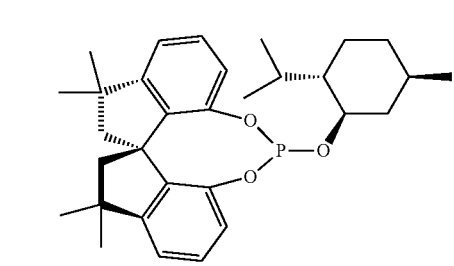
I-4
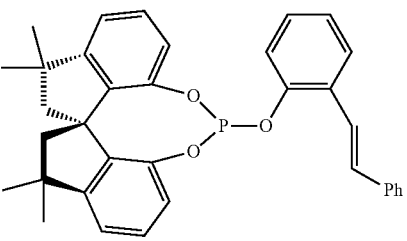
I-5
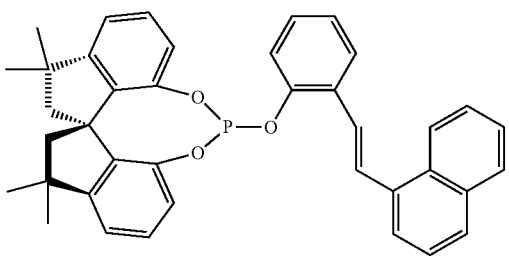
I-6
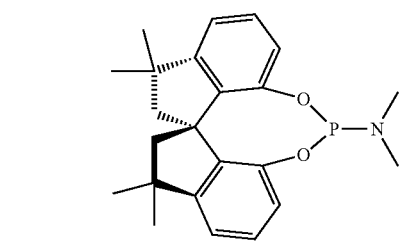
I-7
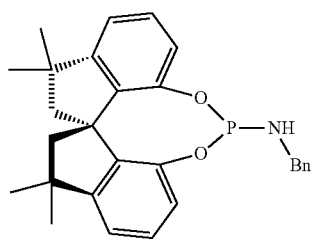
I-8
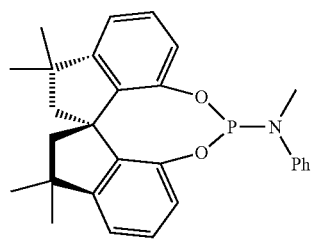

I-9
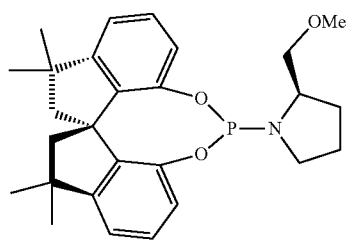
I-14
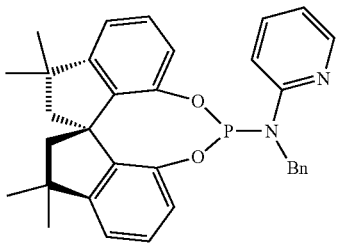
I-10
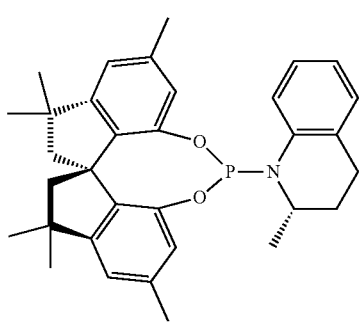
I-15
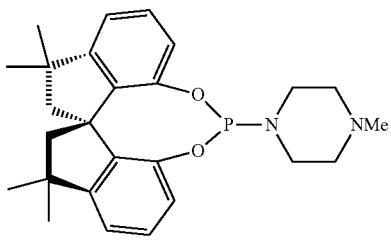
I-11
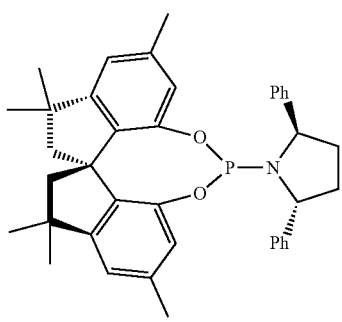
I-16
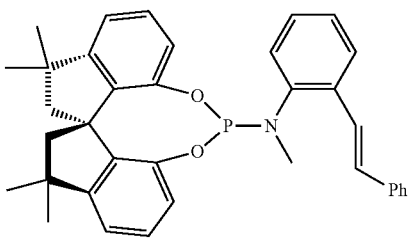
I-17
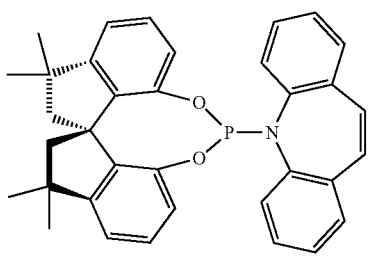
I-12
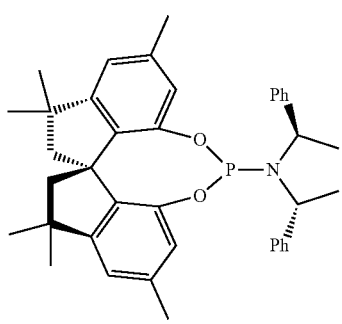
I-18
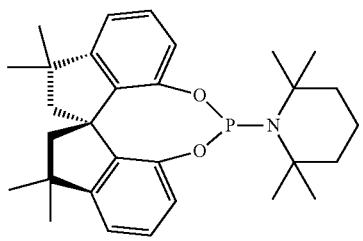
I-13
I-19
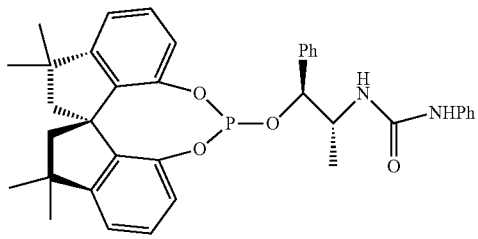

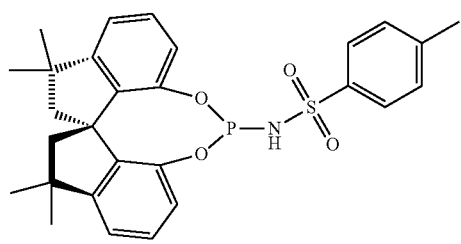
I-20
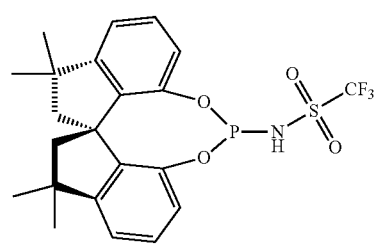
I-21
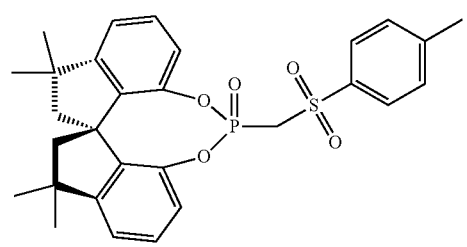
I-22
As the 3,3,3',3'-tetramethyl-1,1'-spirobiindane-based monophosphine ligand according to the present disclosure, the compound represented by formula I' may be any one of the following compounds, or an enantiomer or a raceme thereof:
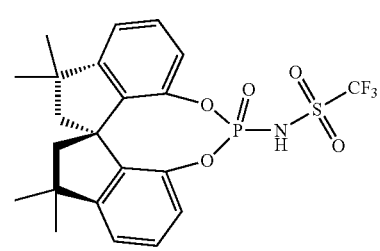
I'-1
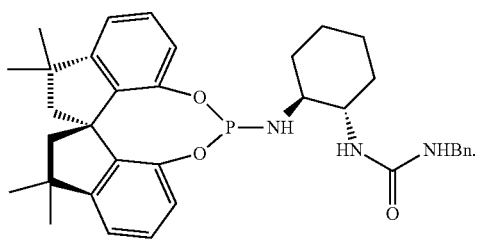
I'-2
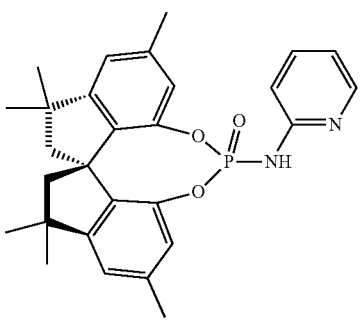
I'-3
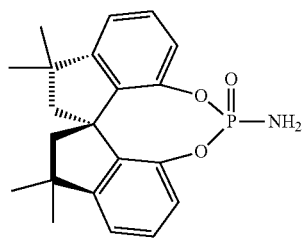
I'-4
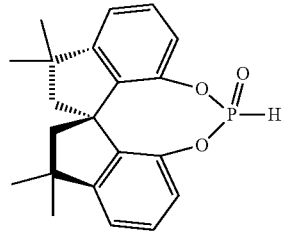
I'-5
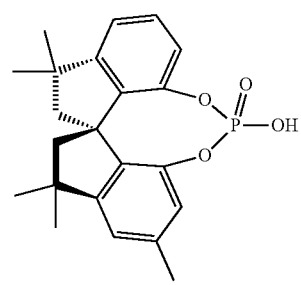
I'-6
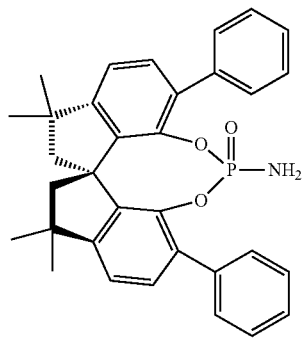
I'-7

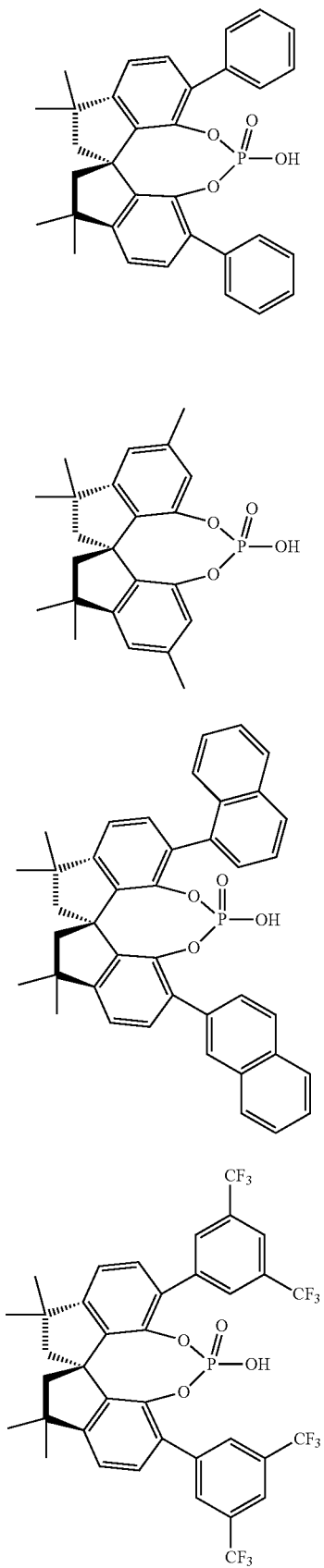

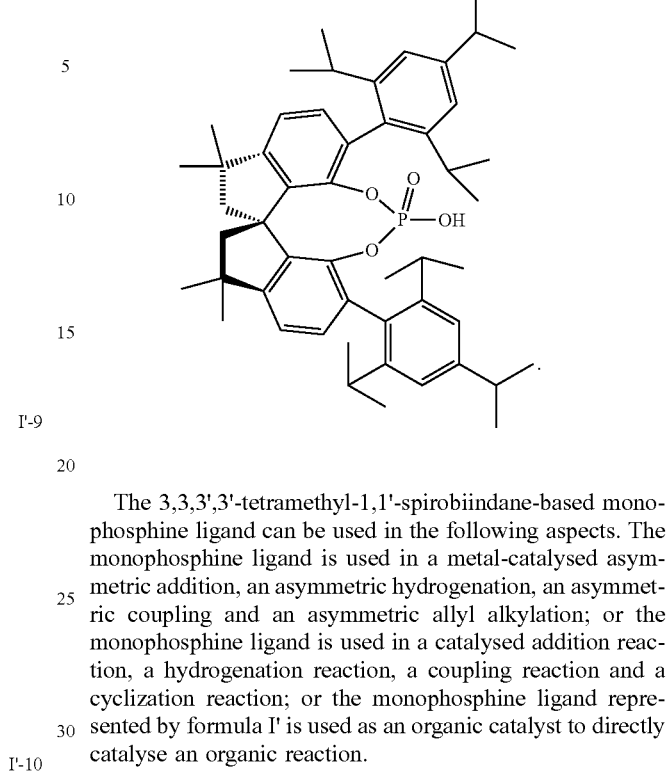

The 3,3,3',3'-tetramethyl-1,1'-spirobiindane-based monophosphine ligand can be used in the following aspects. The monophosphine ligand is used in a metal-catalysed asymmetric addition, an asymmetric hydrogenation, an asymmetric coupling and an asymmetric allyl alkylation; or the monophosphine ligand is used in a catalysed addition reaction, a hydrogenation reaction, a coupling reaction and a cyclization reaction; or the monophosphine ligand represented by formula I' is used as an organic catalyst to directly catalyse an organic reaction.

The present disclosure provides a novel monophosphine ligand that can be used as a ligand in metal-catalysed organic reaction or indirectly catalyzing an organic reaction, especially as a chiral monophosphine ligand widely used in various chiral catalytic reactions, including a symmetric addition, asymmetric hydrogenation, asymmetric coupling and asymmetric allyl alkylation, having economic practicability and industrial application prospect.

DESCRIPTION OF EMBODIMENTS

The following examples will help to understand the present invention, but the present invention is not limited to the content herein.

General reaction conditions: all reactions using air-sensitive reagents are controlled in a nitrogen-filled glove box or conducted by standard Schlenk technology. The reaction solvents are dried using a general standard process.

Example 1

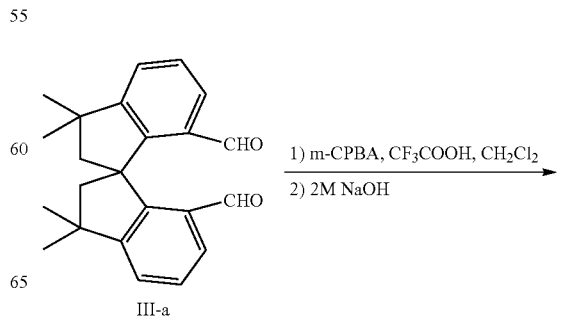

Example 2

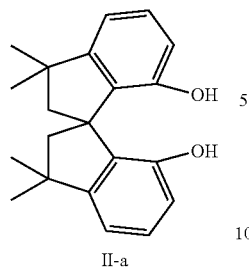

II-a

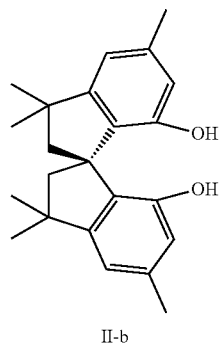

III-b

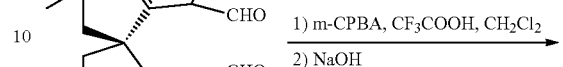

II-b

In a three-necked flask, 2 g (6 mmol) of III-a raceme compound was added, 150 mL of dichloromethane was added under nitrogen protection, the mixture was cooled in an ice bath, 0.9 mL of trifluoroacetic acid (12 mmol) was added, 4.28 g of m-chloroperoxybenzoic acid (m-CPBA, 27 mmol) was added in three batches, the mixture was stirred to dissolve to obtain a reaction solution that was colorless and transparent. After stirring at room temperature overnight for 16 h, the reaction solution became light yellow. The reaction was monitored by TLC plate (color development with 2, 4-dinitrophenylhydrazine), and the reaction was completed. 50 mL of saturated sodium sulfite solution was added to quench the reaction, and the organic phase was sequentially washed with water, saturated sodium bicarbonate solution, and saturated sodium chloride solution, dried over anhydrous sodium sulfate, and concentrated to dryness under reduced pressure. The residual solid was dissolved with 10 mL of methanol, and was stirred slowly while being added with 20 mL of 3 mol/L sodium hydroxide solution, and reacted overnight at room temperature. The reaction was monitored by TLC plate. The reaction solution was acidified to be acidic with 3 mol/L hydrochloric acid at the end of the reaction and a large amount of white solid precipitated. The reaction solution was extracted with 20 mL of ethyl acetate, the organic phase was washed with saturated sodium chloride solution, and dried over anhydrous sodium sulfate, and the solvent was removed by rotary evaporation under reduced pressure. After purification with silica gel column chromatography (ethyl acetate/petroleum ether=1:10), 1.7 g of white solid product II-a was obtained (yield: 91%). IR (film): γ=3805, 3746, 3195, 2983, 2925, 1748, 1683, 1585, 1469, 1456, 1360, 1304, 1242, 1201, 1175. $^1$H NMR (400 MHz, CDCl$_3$) δ 7.21 (m, 2H), 6.83 (d, J=7.5 Hz, 2H), 6.66 (d, J=8.0 Hz, 2H), 4.43 (s, 2H), 2.39 (d, J=13.4 Hz, 2H), 2.33 (d, J=13.4 Hz, 2H), 1.41 (s, 6H), 1.36 (s, 6H). $^{13}$C NMR (101 MHz, CDCl$_3$) δ154.08, 152.71, 130.36, 130.07, 115.41, 114.59, 77.37, 77.05, 76.74, 55.56, 54.14, 44.26, 31.94, 29.68. HRMS (EI, GC-TOF): calcd for $C_{21}H_{24}O_2$ 308.1776, found: 308.1778.

Similarly, by replacing the II-a raceme compound with (R)-III-a compound, a (R)-II-a chiral compound can be obtained with a yield of 90%, $[α]_D^{20}$=−130.1.

In a three-necked flask, 1.44 g of (R)-II-b compound (4 mmol) was added, 150 mL of dichloromethane was added under nitrogen protection, the mixture was cooled in an ice bath, 3.2 g of m-CPBA (16 mmol) was added in three batches, 0.6 mL trifluoroacetic acid (8 mmol) was added, and then the mixture was stirred to dissolve to obtain a reaction solution that was colorless and transparent. After stirring at room temperature overnight for 15 h, the reaction solution became light yellow. The reaction was monitored by TLC plate (color development with 2, 4-dinitrophenylhydrazine), and the reaction was finished. 30 mL of saturated sodium sulfite solution was added to quench the reaction, and the organic phase was sequentially washed with water, saturated sodium bicarbonate, and saturated sodium chloride solution, dried over anhydrous sodium sulfate, and concentrated to dryness under reduced pressure. The residual solid was dissolved with 40 mL of methanol, and was slowly stirred while being added with 16 mL of 1 mol/L sodium hydroxide solution. The mixture reacted overnight at room temperature for 12 h, and the reaction was monitored by TLC plate. The reaction solution was acidified to be acidic with 3 mol/L hydrochloric acid at the end of the solution, and a large amount of white solid precipitated. The reaction solution was extracted with 100 mL of dichloromethane, the organic phase was washed with saturated sodium chloride solution, and dried over anhydrous sodium sulfate, and the solvent was removed by rotary evaporation under reduced pressure. After purification with silica gel column chromatography, 1.14 g of white solid product (R)-II-b was obtained (yield 82%). Characterization data: m.p. 165-167° C.; $[α]_D^{20}$=−124.8 (c1.0, CH$_2$Cl$_2$); $^1$H NMR (400 MHz, DMSO) δ6.63 (s, 2H), 6.50 (s, 2H), 4.41 (s, 2H), 2.35 (d, J=13.4 Hz, 2H), 2.30 (m, 8H), 1.38 (s, 6H), 1.33 (s, 6H); $^{13}$C NMR (100 MHz, DMSO) δ154.0, 152.4, 140.7, 127.1, 116.1, 115.4, 55.9, 53.4, 44.1, 31.9, 29.6, 21.5;

Similarly, by replacing the (R)-III-b compound with the III-b raceme compound, the II-b raceme compound can be obtained with a yield of 80%.

Example 3

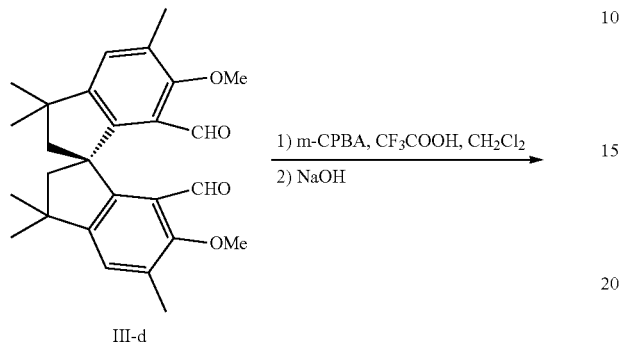

III-d

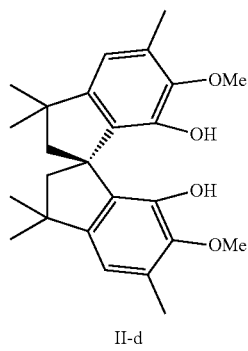

II-d

According to the experimental procedure of Example 2, (R)-III-d was used instead of (R)-III-b compound to obtain a product (R)-II-d (yield of 92%). $^1$H NMR (400 MHz, CDCl$_3$) δ 6.55 (s, 2H), 5.09 (s, 2H), 3.71 (s, 6H), 2.47 (d, J=13.0 Hz, 2H), 2.29 (s, 6H), 2.22 (d, J=13.0 Hz, 2H), 1.37 (s, 6H), 1.31 (s, 6H).

Example 4

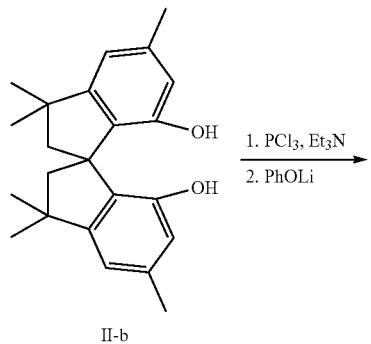

II-b

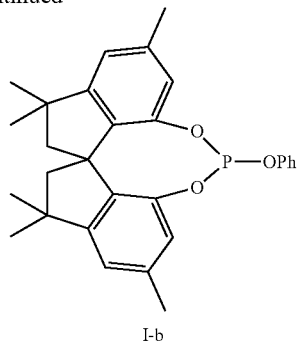

I-b

Under the protection of nitrogen, 20 mL of tetrahydrofuran, phosphorus trichloride (1.3 mmol) and triethylamine (2.7 mmol) were added sequentially to a dried round bottom flask. The system was cooled to −78° C., stirred evenly, and slowly injected with 5 mL of I-b (1.25 mmol) in tetrahydrofuran solution, and a large amount of white precipitate quickly formed. After maintaining the temperature for 1 h, the temperature was naturally raised to room temperature, and the reaction was continued for 1 h to obtain a suspension. The precipitate was removed by anhydrous and anaerobic filtration with a steel bridge, and the precipitate was washed with 5 mL of tetrahydrofuran to obtain a clear solution of spirophosphonyl chloride. The clear solution was cooled to −78° C. and a THF solution of lithium phenolate was added, to react at that temperature for 1 h, then the temperature was naturally raised to room temperature, the reaction was conducted at room temperature overnight with stirring, and then the solvent was removed under reduced pressure. After purification with column chromatography under nitrogen protection, a white solid compound I-b was obtained with a yield of 65%. The preparation process of the THF solution of lithium phenolate includes: under nitrogen protection, adding 5 mL of tetrahydrofuran and phenol (1.5 mmol) in a 10 mL reaction flask, cooling to −30° C., adding n-butyllithium (1.6M, 1.5 mmol) in n-hexane solution, reacting at that temperature for 30 minutes, and then naturally raising the temperature to the room temperature to complete preparation.

Similarly, by replacing the II-b raceme compound with the (R)-II-b compound, the (R)-I-b compound can be obtained with a yield of 60%. Characterization data: m.p. 73-75° C.; $[\alpha]_D^{20}$=+163.3 (c1.0, CH$_2$Cl$_2$); $^1$H NMR (400 MHz, CDCl3) δ 7.38-7.27 (m, 2H), 7.11 (t, J=7.4 Hz, 1H), 7.06 (m, 2H), 6.83 (s, 1H), 6.79 (s, 1H), 6.79 (s, 1H), 6.54 (s, 1H), 2.39 (d, J=12.7 Hz, 2H), 2.36 (s, 3H), 2.28 (s, 3H), 2.05 (d, J=12.5 Hz, 2H), 1.53 (s, 3H), 1.50 (s, 3H), 1.28 (s, 3H), 1.25 (s, 3H).

Following a similar reaction process, the following chiral ligand can be obtained, and the structure, the yield, and the characterization data are as follows:

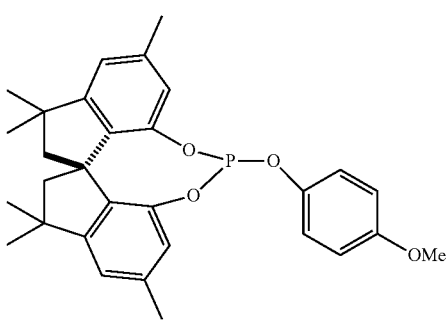

yield of 72%; white solid, m.p. 64-66° C.; $[\alpha]_D^{20}=+145.5$ (c1.0, CH$_2$Cl$_2$); $^1$H NMR (400 MHz, CDCl$_3$) δ 6.97 (d, J=8.9 Hz, 2H), 6.83 (d, J=6.4 Hz, 2H), 6.82 (s, 1H), 6.80 (s, 1H), 6.77 (s, 1H), 6.57 (s, 1H), 3.79 (s, 3H), 2.38 (d, J=12.6 Hz, 2H), 2.35 (s, 3H), 2.29 (s, 3H), 2.04 (d, J=12.2 Hz, 2H), 1.53 (s, 3H), 1.50 (s, 3H), 1.27 (s, 3H), 1.25 (s, 3H); HRMS (EI, GC-TOF): calcd for C$_{30}$H$_{33}$O$_4$P 488.2116, found 488.2115.

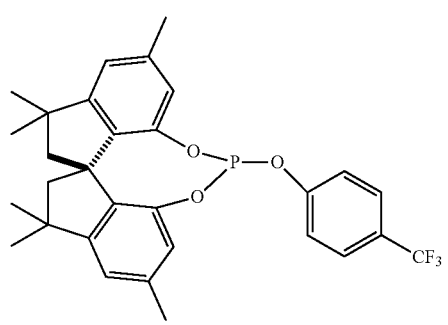

yield of 71%; white solid, m.p. 49-51° C.; $[\alpha]_D^{20}=+161.7$ (c1.0, CH$_2$Cl$_2$); $^1$H NMR (400 MHz, CDCl$_3$) δ 7.55 (d, J=8.7 Hz, 2H), 7.09 (d, J=8.4 Hz, 2H), 6.85 (s, 1H), 6.80 (s, 1H), 6.78 (s, 1H), 6.48 (s, 1H), 2.41-2.35 (m, 5H), 2.25 (s, 3H), 2.03 (dd, J=12.5, 2.1 Hz, 2H), 1.53 (s, 3H), 1.50 (s, 3H), 1.27 (s, 3H), 1.26 (s, 3H).

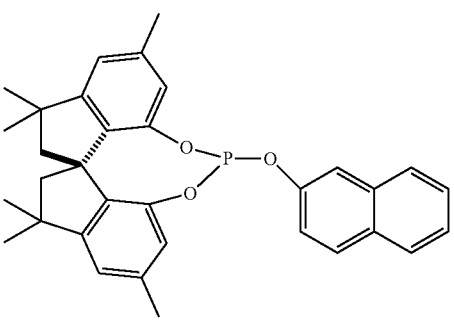

yield of 80%; white solid, m.p. 100-102° C.; $[\alpha]_D^{20}=+89.1$ (c1.0, CH$_2$Cl$_2$); $^1$H NMR (400 MHz, CDCl$_3$) δ 7.79 (m, 3H), 7.46 (m, 3H), 7.19 (dd, J=8.9, 2.3 Hz, 1H), 6.85 (s, 1H), 6.82 (s, 1H), 6.81 (s, 1H), 6.57 (s, 1H), 2.40 (d, J=12.6 Hz, 2H), 2.37 (s, 3H), 2.26 (s, 3H), 2.06 (dd, J=12.4, 3.7 Hz, 2H), 1.54 (s, 3H), 1.51 (s, 3H), 1.29 (s, 3H), 1.26 (s, 3H).

Example 5

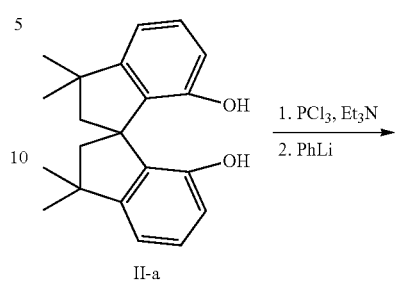

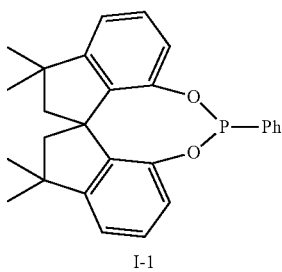

Under protection of nitrogen, 20 mL of tetrahydrofuran, phosphorus trichloride (1.3 mmol) and triethylamine (2.7 mmol) were added sequentially to a dried round bottom flask. The system was cooled to −78° C., stirred evenly, and slowly injected with 5 ml of I-a (1.25 mmol) in tetrahydrofuran solution, and a large amount of white precipitate quickly formed. After reaction at that temperature for 1 h, the temperature was naturally raised to room temperature, and the reaction was continued for 1 h to obtain a suspension. The precipitate was removed by anhydrous and anaerobic filtration with a steel bridge, and the precipitate was washed with 5 mL of tetrahydrofuran to obtain a clear solution of spirophosphonyl chloride. The clear solution was cooled to −78° C., and added with a THF solution of phenyllithium. After reaction while maintaining the temperature for 1 h, the temperature was naturally raised to room temperature, the reaction was stirred overnight, and then desolvated under reduced pressure. After purification with column chromatography, a white solid compound I-1 was obtained with a yield of 75%. The preparation process of the THF solution of phenyllithium includes: under nitrogen protection, adding 5 mL tetrahydrofuran and benzene bromide (1.5 mmol) to a 10 mL reaction flask, cooling to 50° C., adding n-butyl lithium (1.6 M, 1.5 mmol) in n-hexane, reacting while maintaining the temperature for 30 minutes, then naturally raising the temperature to room temperature, and continuing the reaction at room temperature for 4 hours to complete the preparation.

Similarly, by replacing the II-a raceme compound with the (R)-II-a compound, the (R)-I-1 compound can be obtained with a yield of 62%.

Example 6

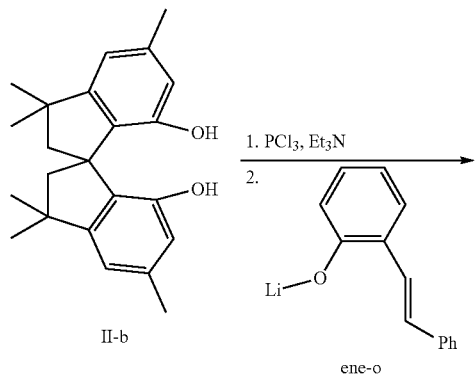

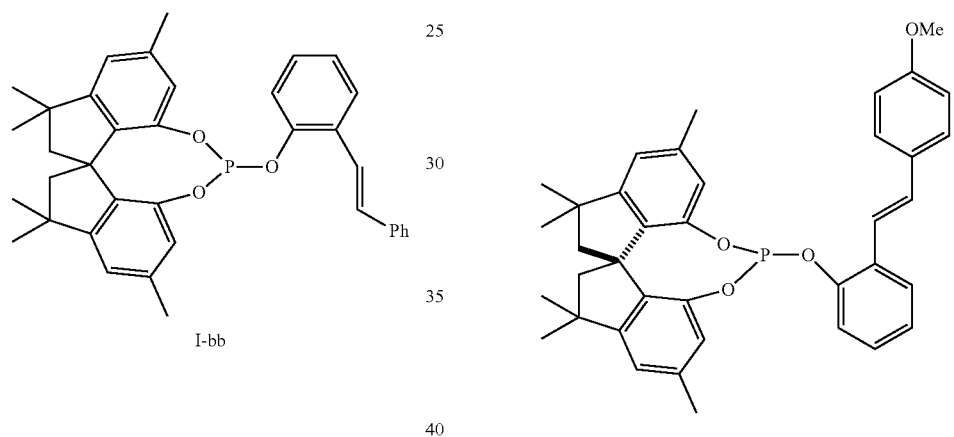

Under the protection of nitrogen, 20 mL of tetrahydrofuran, phosphorus trichloride (1.3 mmol) and triethylamine (2.7 mmol) were added sequentially to a dried round bottom flask. The system was cooled to −78° C., stirred evenly, and slowly injected with 5 mL of II-b (1.25 mmol) in tetrahydrofuran, and a large amount of white precipitate was quickly formed. After maintaining the temperature and reacting for 1 h, the temperature was naturally raised to room temperature, and the reaction was continued for 1 h to obtain a suspension. The precipitate was removed by anhydrous and anaerobic filtration with a steel bridge, and the precipitate was washed with 5 mL of tetrahydrofuran to obtain a clear solution of spirophosphonyl chloride. The clear solution was cooled to −78° C., and added with O-alkenylphenol lithium salt (ene-o) in THF. After reacting while maintaining the temperature for 1 h, the temperature was naturally raised to room temperature, and the reaction was stirred overnight, and then desolvated under reduced pressure. After purification with column chromatography, a white solid compound I-bb was obtained with a yield of 75%. The preparation process of the o-alkenylphenol lithium salt (ene-o) in THF includes: under nitrogen protection, adding 5 mL tetrahydrofuran and benzene bromide (1.5 mmol) to a 10 mL reaction flask, cooling to 30° C., adding o-alkenylphenol lithium salt (ene-o) (1.5 mmol), reacting while maintaining the temperature for 30 minutes, then the temperature naturally rising to room temperature, and continuing the reaction at room temperature for 4 hours to complete the preparation.

Similarly, by replacing the II-b raceme compound with the (R)-II-b compound, the (R)-I-bb compound can be obtained with a yield of 62%.

Characterization data: white solid, m.p. 60-62° C.; $[\alpha]D_{20}$=+318 (c0.1, CH$_2$Cl$_2$); $^1$H NMR (400 MHz, CDCl$_3$) δ7.71-7.64 (m, 1H), 7.39 (d, J=7.3 Hz, 2H), 7.32 (t, J=7.5 Hz, 2H), 7.28-7.18 (m, 3H), 7.15-7.03 (m, 3H), 6.83 (s, 1H), 6.77 (s, 1H), 6.74 (s, 1H), 6.51 (s, 1H), 2.40 (dd, J=12.5, 10.4 Hz, 2H), 2.33 (s, 3H), 2.14-1.98 (m, 5H), 1.53 (s, 3H), 1.52 (s, 3H), 1.32 (s, 3H), 1.25 (s, 3H).

Following a similar reaction process, the following chiral phosphaalkene ligand can be obtained, and the structure and yield and the characterization data are as follows:

81% yield; white solid, m.p. 63-65° C.; $[\alpha]_D^{20}$=+140 (c0.1, CH$_2$Cl$_2$); $^1$H NMR (400 MHz, CDCl$_3$) δ7.65 (m, 1H), 7.37-7.29 (m, 2H), 7.25-7.13 (m, 2H), 7.10 (s, 1H), 6.97 (d, J=3.7 Hz, 2H), 6.90-6.84 (m, 2H), 6.83 (s, 1H), 6.78 (s, 1H), 6.73 (s, 1H), 6.51 (s, 1H), 3.83 (s, 3H), 2.40 (dd, J=12.5, 10.7 Hz, 2H), 2.33 (s, 3H), 2.13-2.00 (m, 5H), 1.53 (s, 3H), 1.52 (s, 3H), 1.33 (s, 3H), 1.25 (s, 3H).

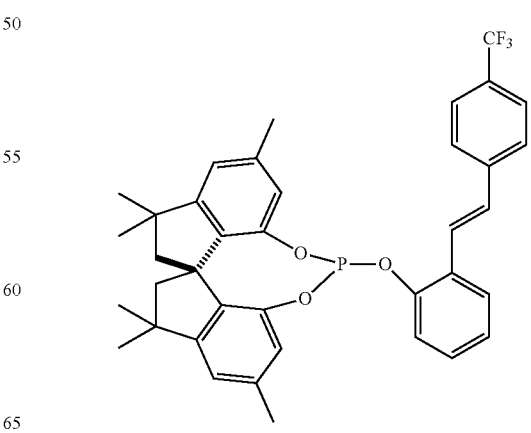

77% yield; white solid, m.p. 68-70° C.; $[\alpha]_D^{20}$=+254 (c0.1, CH$_2$Cl$_2$); $^1$H NMR (400 MHz, CDCl$_3$) δ7.67 (d, J=7.5 Hz, JH), 7.56 (d, J=8.3 Hz, 2H), 7.45 (d, J=8.2 Hz, 2H), 7.33-7.22 (m, 2H), 7.18-7.10 (m, 2H), 7.03 (d, J=16.5 Hz, 1H), 6.84 (s, 1H), 6.76 (s, 1H), 6.72 (s, 1H), 6.46 (s, 1H), 2.40 (t, J=12.9 Hz, 2H), 2.34 (s, 3H), 2.14-1.99 (m, 5H), 1.53 (s, 3H), 1.53 (s, 3H), 1.31 (s, 3H), 1.26 (s, 3H).

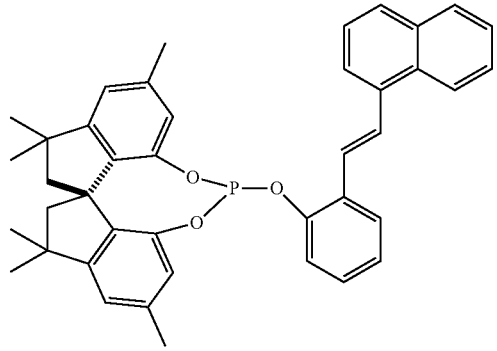

68% yield; white solid, m.p. 67-69° C.; $[\alpha]_D^{20}$=+217 (c0.1, CH$_2$Cl$_2$); $^1$H NMR (400 MHz, CDCl$_3$) δ8.21 (d, J=7.6 Hz, 1H), 7.82 (m, 4H), 7.60 (d, J=7.1 Hz, 1H), 7.55-7.41 (m, 3H), 7.25 (d, J=5.1 Hz, 2H), 7.20-7.10 (m, 2H), 6.82 (s, 1H), 6.72 (s, 1H), 6.70 (s, 1H), 6.52 (s, 1H), 2.37 (dd, J=12.8, 3.6 Hz, 2H), 2.30 (s, 3H), 2.11-1.96 (m, 5H), 1.52 (s, 3H), 1.48 (s, 3H), 1.24 (s, 3H), 1.20 (s, 3H).

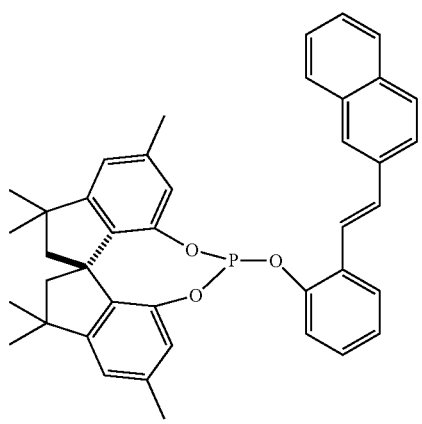

73% yield; white solid, m.p. 91-93° C.; $[\alpha]_D^{20}$=+285 (c0.1, CH$_2$Cl$_2$); $^1$H NMR (400 MHz, CDCl$_3$) δ7.86-7.71 (m, 5H), 7.59 (m, 1H), 7.51-7.40 (m, 2H), 7.30-7.19 (m, 4H), 7.18-7.07 (m, 1H), 6.83 (s, 1H), 6.78 (s, 1H), 6.75 (s, 1H), 6.54 (s, 1H), 2.41 (t, J=12.9 Hz, 2H), 2.31 (s, 3H), 2.15-2.01 (m, 5H), 1.54 (s, 3H), 1.53 (s, 3H), 1.35 (s, 3H), 1.26 (s, 3H).

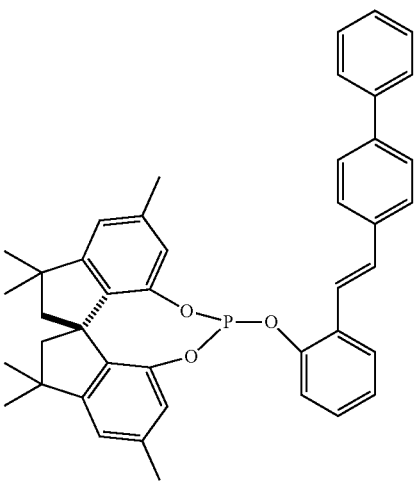

69% yield; white solid, m.p. 78-80° C.; $[\alpha]_D^{20}$=+114 (c0.1, CH$_2$Cl$_2$); $^1$H NMR (400 MHz, CDCl$_3$) δ7.72-7.66 (m, 1H), 7.66-7.60 (m, 2H), 7.57 (d, J=8.3 Hz, 2H), 7.45 (m, 4H), 7.35 (m, 1H), 7.28-7.19 (m, 2H), 7.18-7.02 (m, 3H), 6.83 (s, 1H), 6.79 (s, 1H), 6.74 (s, 1H), 6.52 (s, 1H), 2.40 (t, J=12.2 Hz, 2H), 2.33 (s, 3H), 2.16-2.00 (m, 5H), 1.53 (s, 3H), 1.53 (s, 3H), 1.34 (s, 3H), 1.26 (s, 3H).

Example 7

Synthesis of (R)-3,3,3',3'-tetramethyl-1,1'-spirobiindane-6, 6'-diphenyl-7,7'-diol

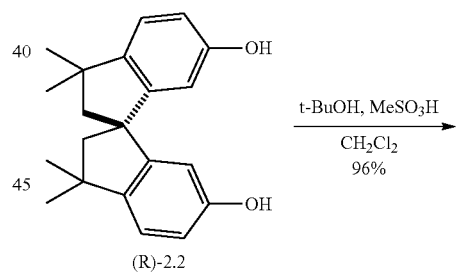

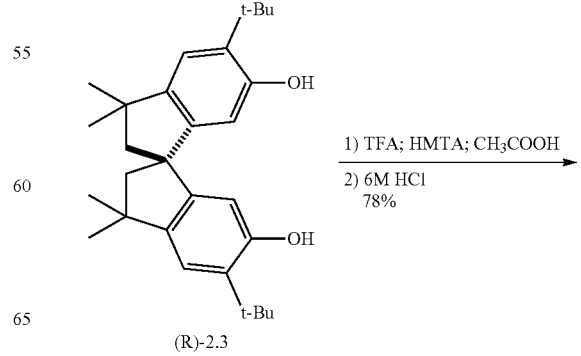

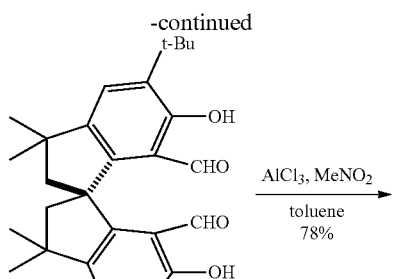

(R)-2.4

AlCl₃, MeNO₂
toluene
78%

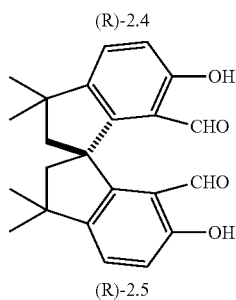

(R)-2.5

Tf₂O, Pyridine
DCM
95%

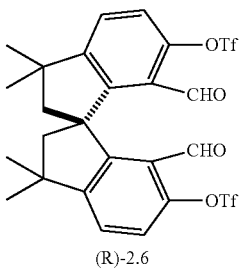

(R)-2.6

PhB(OH)₂, K₃PO₄·3H₂O
Pd(Ph₃P)₄ (20% mol)
KBr (20% mol)
DME/H₂O = 10/3
Reflux

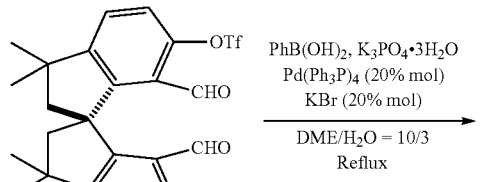

(R)-3.9

1) m-cpba, CH₂Cl₂
2) Na₂SO₃ (aq)

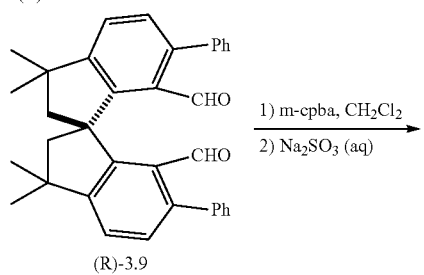

(R)-3.10

A compound (R)-2.6 was first prepared according a literature method (PCT/CN2017/119944), and the related compounds are characterized as follows: (R)-5,5'-di-tert-butyl-3,3,3',3'-tetramethyl-2,2',3,3'-tetrahydro-1,1'-spirobi[indene]-6,6'-diol ((R)-2.3)

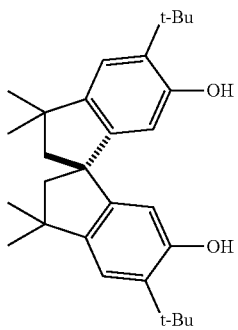

Yield=96%. m.p. 193-195° C. [α]²⁰_D=47.3IR (film): γ=3537, 2954, 2866, 1615, 1499, 1464, 1409, 1361, 1250, 1167, 1116, 889, 852, 741. ¹H NMR (400 MHz, CDCl3) δ 7.05 (s, 2H), 5.40 (s, 2H), 3.04 (s, 2H), 2.29 (d, J=13.0 Hz, 2H), 2.09 (d, J=13.0 Hz, 2H), 1.43 (s, 6H), 1.35 (s, 18H), 1.28 (s, 6H). ¹³C NMR (101 MHz, CDCl3) δ 153.68, 149.14, 144.01, 135.07, 119.72, 111.78, 59.59, 56.69, 43.22, 34.65, 31.81, 30.47, 29.77. HRMS (EI, GC-TOF): calcd for $C_{29}H_{40}O_2$ 420.3038, found: 420.3034.

(R)-5,5'-di-tert-butyl-6,6'-dihydroxy-3,3,3',3'-tetramethyl-2,2',3,3'-tetrahydro-1,1'-spirobi[indene]-7,7'-dicarbaldehyde ((R)-2.4)

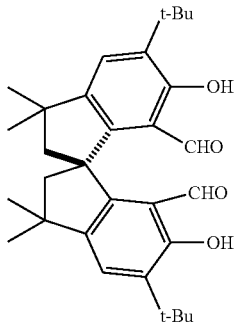

Yield=78%. m.p. 186-188° C. [α]²⁰_D=−76.8. IR (film): γ=2956, 2925, 2869, 1685, 1637, 1606, 1465, 1430, 1391, 1363, 1303, 1283, 1253, 1201, 1186, 1163. ¹H NMR (400 MHz, CDCl₃) δ 12.55 (s, 2H), 9.60 (s, 2H), 7.30 (s, 2H), 2.56 (d, J=13.5 Hz, 2H), 2.39 (d, J=13.5 Hz, 2H), 1.42 (s, 18H), 1.37 (s, 6H), 1.35 (s, 6H). ¹³C NMR (101 MHz, CDCl₃) δ 195.17, 163.72, 149.48, 141.37, 139.25, 128.91, 114.19, 77.35, 77.03, 76.71, 60.32, 57.56, 43.19, 35.07, 32.06, 30.13, 29.31. HRMS (EI, GC-TOF): calcd for $C_{31}H_{40}O_4$ 476.2927, found: 476.2927.

(R)-6,6'-dihydroxy-3,3,3',3'-tetramethyl-2,2',3,3'-tetrahydro-1,1'-spirobi[indene]-7,7'-dicarbaldehyde ((R)-2.5)

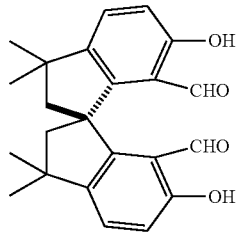

Yield=78%. m.p. 213-214° C. $[\alpha]^{20}_D$=−121.3. IR (film): γ=2%1, 2867, 1659, 1604, 1579, 1454, 1392, 1285, 1181, 1165, 1151. H NMR (400 MHz, CDCl$_3$) δ 11.72 (s, 2H), 9.58 (s, 2H), 7.35 (d, J=8.6 Hz, 2H), 6.94 (d, J=8.6 Hz, 2H), 2.62 (d, J=13.5 Hz, 2H), 2.43 (d, J=13.5 Hz, 2H), 1.39 (s, 6H), 1.37 (s, 6H). $^{13}$C NMR (101 MHz, CDCl$_3$) δ 194.28, 163.97, 152.08, 142.55, 132.07, 118.97, 114.37, 60.20, 58.04, 43.01, 32.01, 30.11. HRMS (EI, GC-TOF): calcd for $C_{23}H_{24}O_4$ 364.1675, found: 364.1679.

(R)-7,7'-diformyl-3,3,3',3'-tetramethyl-2,2',3,3'-tetrahydro-1,1'-spirobi[indene]-6, 6'-diyl bis(trifluoromethanesulfonate) ((R)-2.6)

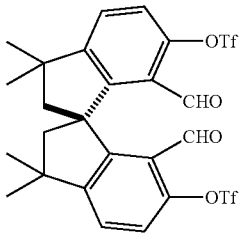

Yield=95%. m.p. 117-118° C. $[\alpha]^{20}_D$=−231.9. IR (film): γ=2961, 2870, 1704, 1649, 1600, 1470, 1428, 1365, 1250, 1216, 1140, 869, 841, 805. $^1$H NMR (400 MHz, CDCl$_3$) δ 9.88 (s, 2H), 7.52 (d, J=8.4 Hz, 2H), 7.30 (d, J=8.4 Hz, 2H), 2.53-2.41 (m, 4H), 1.51 (s, 6H), 1.43 (s, 6H). $^{13}$C NMR (101 MHz, CDCl$_3$) δ 186.57, 154.89, 151.81, 149.98, 128.90, 123.35, 118.565 (q, J=319 Hz), 59.18, 57.28, 43.22, 32.43, 29.01. HRMS (EI, GC-TOF): calcd for $C_{25}H_{22}F_6O_8S_2$ 628.0660, found: 628.0655.

Then, 628 mg of compound (R)-2.6 (1 mmol), 100 mg (0.1 mmol) of Pd(PPh$_3$)$_4$, 480 mg (4 mmol) of phenylboronic acid, and 12 mg (0.1 mg) of KBr solid were added in a three-necked flask. Under nitrogen protection, 5 mL of ethylene glycol dimethyl ether was added, the system was heated to reflux, and a small amount of insoluble solids appeared. 530 mg (2 mmol) of potassium phosphoric acid trihydrate was dissolved in 1.5 mL water, and poured into the reaction solution to dissolve. The reaction with reflux was continued for 24 h, and the reaction was monitored by TLC plate. After the reaction was completed, water was added to quench the reaction, the reaction solution was extracted with ethyl acetate. The organic phase was washed with water and saturated sodium chloride solution, concentrated by rotary evaporation, and subjected to column chromatography (eluent ethyl acetate/petroleum ether=1/50), to give a white solid (R)-3.9 with a yield of 90%.

In a three-necked flask, 484 mg (R)-3.9 (1 mmol) was added, and under nitrogen protection, 20 mL dichloromethane solvent was added. The mixture was cooled in an ice bath, added with 0.15 ml (2 mmol) trifluoroacetic acid, stirred for 10 min, and then added with 692 mg m-CPBA solid (4 mmol). The temperature was raised to room temperature, and the solution reacted overnight, and the solution changed from colorless to light yellow. The reaction was monitored by TLC plate. After the reaction was completed, saturated sodium sulfite solution was added to quench the reaction. After stirring at room temperature for 1 h, the reaction solution was extracted with ethyl acetate, the organic phase was washed sequentially with water, saturated sodium bicarbonate, and saturated sodium chloride. The organic phase was concentrated, and subjected to column chromatography (eluent: ethyl acetate/petroleum ether=1/50), to give (R)-3,3,3',3'-tetramethyl-1,1'-spirobiindane-6, 6'-diphenyl-7,7'-diphenol (R)-3.10, a white solid, 410 mg, yield of 92%.

(R)-3,3,3',3'-tetramethyl-6,6'-diphenyl-2,2',3,3'-tetrahydro-1,1'-spirobi[indene]-7, 7'-dicarbaldehyde ((R)-3.9)

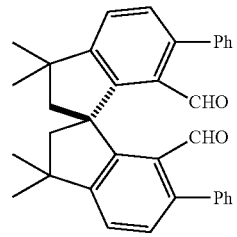

m.p. 130-132° C. $[\alpha]^{20}_D$=−128.2. Yield=90%. m.p. 197-198° C. IR (film): γ=3505, 5056, 2954, 2863, 2751, 1698, 1582, 1566, 1466, 1446, 1129, 760. $^1$H NMR (400 MHz, CDCl$_3$) 9.50 (s, 2H), 7.45 (d, J=7.8 Hz, 2H), 7.35-7.16 (m, 12H), 2.74 (d, J=12.5 Hz, 2H), 2.47 (d, J=12.5 Hz, 2H), 1.58 (s, 6H), 1.47 (s, 6H). $^{13}$C NMR (101 MHz, CDCl$_3$) δ 192.88, 154.09, 149.88, 145.04, 139.54, 130.23, 130.04, 129.25, 128.05, 127.45, 126.37, 77.37, 77.05, 76.73, 59.63, 57.86, 43.05, 32.66, 29.29. HRMS (ESI): calcd for $C_{35}H_{32}O_2$ 484.2402, [M+23] 507.2295, found 507.2280.

(R)-3,3,3',3'-tetramethyl-6,6'-diphenyl-2,2',3,3'-tetrahydro-1,1'-spirobi[indene]-7, 7'-diol ((R)-3.10)

(R)-3,3,3',3'-tetramethyl-1,1'-spirobiindane-6, 6'-diphenyl-7,7'-diol

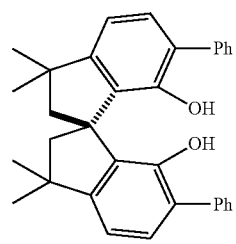

m.p. 171-172° C. [α]$^{20}_D$=210.2. Yield=92%. m.p. 213-214° C. IR (film): γ=3452, 3060, 2956, 2864, 1744, 1676, 1612, 1473, 1418, 1383, 1181, 1114, 828, 768, 701. $^1$H NMR (400 MHz, CDCl$_3$) 7.37-7.23 (m, 14H), 7.14 (d, J=7.8 Hz, 2H), 2.62 (d, J=13.4 Hz, 2H), 2.38 (d, J=13.4 Hz, 2H), 1.48 (s, 6H), 1.39 (s, 6H). $^{13}$C NMR (101 MHz, CDCl$_3$) δ 158.31, 153.87, 143.10, 139.92, 137.30, 134.08, 130.86, 129.11, 128.42, 127.35, 120.58, 77.37, 77.05, 76.73, 56.96, 55.87, 44.15, 32.82, 29.03. HRMS (ESI): calcd for C$_{33}$H$_{32}$O$_2$ 460.2089, found: 460.2062.

Example 8

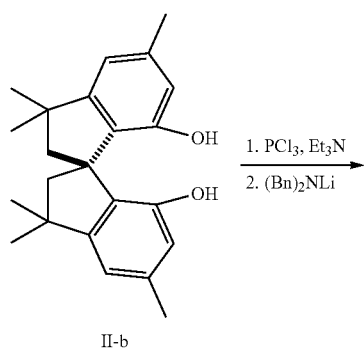

II-b

1. PCl$_3$, Et$_3$N
2. (Bn)$_2$NLi

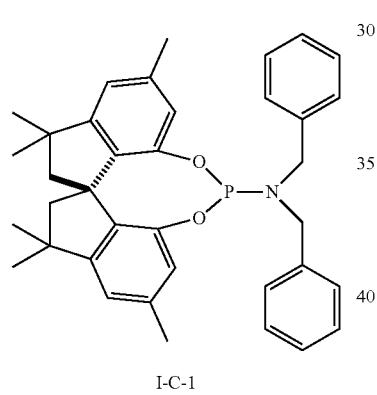

I-C-1

Under the protection of nitrogen, 20 mL of tetrahydrofuran, phosphorus trichloride (1.3 mmol) and triethylamine (2.7 mmol) were added sequentially to a dried round bottom flask. The system was cooled to −78° C., stirred evenly, and slowly injected with 5 mL of (R)-II-b (1.25 mmol) in tetrahydrofuran, and a large amount of white precipitate quickly formed. After maintaining the temperature and reacting for 1 h, the temperature rose naturally to room temperature, and the reaction was continued for 1 h to obtain a suspension. The precipitate was removed from the suspension by anhydrous and anaerobic filtration with a steel bridge, and the precipitate was washed with 5 mL of tetrahydrofuran to obtain a clear solution of spirophosphonyl chloride. The clear solution was cooled to −78° C., and added with dibenzylaminolithium (1.5 mol) in 5 mL THF. After reacting while maintaining that temperature for 1 h, the temperature naturally rose to room temperature, and the reaction was stirred overnight, and then desolvated under reduced pressure. After column chromatography under nitrogen protection, a white solid compound (R)—I-C-1 was obtained with a yield of 75%.

According to the similar reaction process, the following chiral ligand can be obtained:

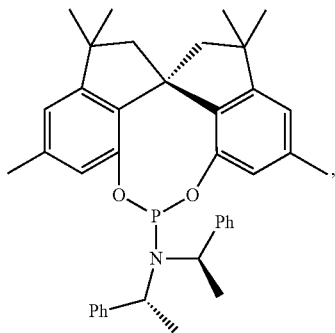

(S, R, R)-type ligand, yield of 70%, $^1$H NMR (400 MHz, CDCl$_3$) δ 7.24-7.16 (m, 6H), 6.98-6.91 (m, 4H), 6.78 (d, J=5.7 Hz, 2H), 6.62 (s, 1H), 5.62 (s, 1H), 4.27-4.19 (m, 2H), 2.42-2.33 (m, 4H), 2.24 (d, J=12.6 Hz, 1H), 2.07 (d, J=11.9 Hz, 1H), 1.88-1.85 (m, 4H), 1.62 (s, 3H), 1.61 (s, 3H), 1.49 (s, 3H), 1.48 (s, 3H), 1.20 (s, 3H), 1.16 (s, 3H).

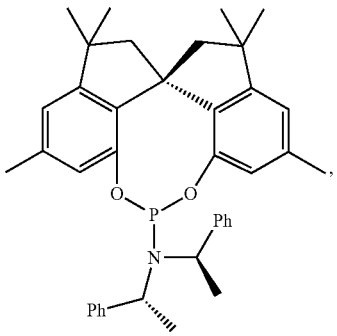

(R, R, R)-type ligand, yield of 75%, $^1$H NMR (400 MHz, CDCl$_3$) δ 7.16-6.99 (m, 10H), 6.80 (s, 1H), 6.77 (s, 1H), 6.73 (s, 1H), 6.46 (s, 1H), 4.30-4.22 (s, 2H), 2.43 (d, J=12.5 Hz, 1H), 2.38 (s, 3H), 2.31-2.28 (m, 4H), 2.16 (d, J=12.5 Hz, 1H), 1.92 (d, J=12.5 Hz, 1H), 1.54 (s, 3H), 1.49 (s, 3H), 1.20 (s, 3H), 1.19 (s, 3H).

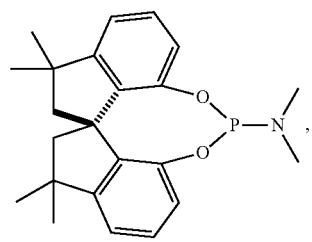

I-6 yield of 78%,

With (±)-II-d as a raw material, following a similar reaction process as mentioned above, the following chiral ligand, as a diastereoisomer, can be obtained after separation by column chromatography:

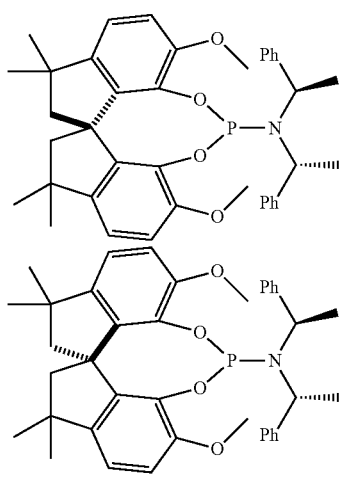

Diastereomer 1: $^1$H NMR (400 MHz, CDCl$_3$) δ 7.18-7.16 (m, 6H), 6.99-6.96 (m, 4H), 6.80 (s, 1H), 6.53 (s, 1H), 4.55-4.45 (m, 2H), 3.75 (s, 3H), 3.68 (s, 3H), 2.34-2.31 (d, J=15.3 Hz, 5H), 2.26 (d, J=13.1 Hz, 2H), 2.16 (s, 3H), 1.44 (s, 3H), 1.42 (s, 3H), 1.34 (s, 3H), 1.33 (s, 3H), 1.29 (s, 3H), 1.17 (s, 3H). yield: 38%;

Diastereomer 2: $^1$H NMR (400 MHz, CDCl$_3$) δ 7.19-7.13 (m, 6H), 7.04-7.02 (m, 4H), 6.79 (s, 1H), 6.36 (s, 1H), 4.89-4.80 (m, 2H), 3.75 (s, 3H), 3.51 (s, 3H), 2.57 (d, J=12.8 Hz, 1H), 2.45 (d, J=13.0 Hz, 1H), 2.32 (s, 3H), 2.22-2.16 (m, 2H), 2.03 (s, 3H), 1.60 (s, 3H), 1.58 (s, 3H), 1.41 (s, 3H), 1.35 (s, 3H), 1.31 (s, 3H), 1.26 (s, 3H). yield: 35%.

Example 9

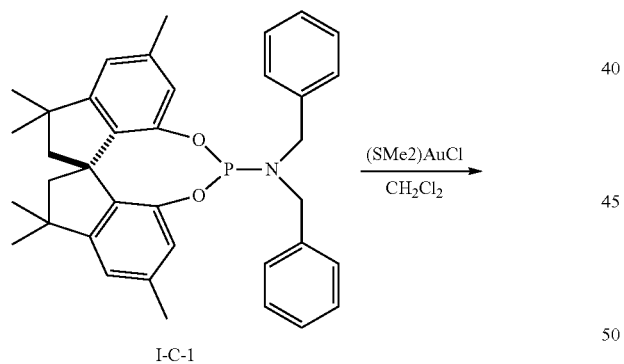

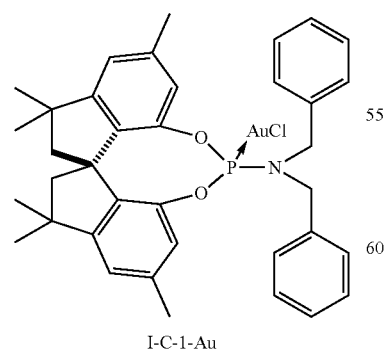

1 mmol of (SMe$_2$)AuCl was dissolved in 5 mL of dichloromethane, and cooled to 0-5° C. Then, 3 mL dichloromethane containing 1 mmol of the ligand I-C-1 was added dropwise with stirring. After the dropwise addition was finished, the temperature naturally rose to room temperature, and the reaction continued with stirring for 2 h. After confirming the disappearance of the starting material by TLC monitoring, the solvent was distilled off under reduced pressure, and the remaining substance was dried in vacuum to obtain a quantitative gold(I) chloride complex I-C-1-Au.

Following a similar reaction process, the following five structures of gold(I) chloride complexes were obtained, the yields are all quantitative:

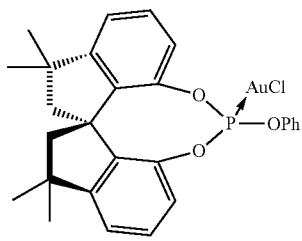

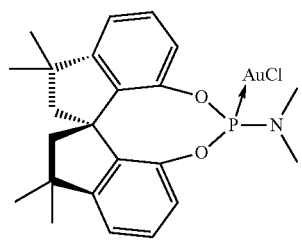

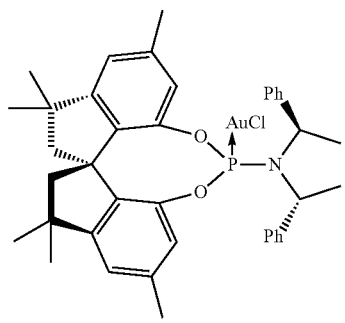

I-Au-1

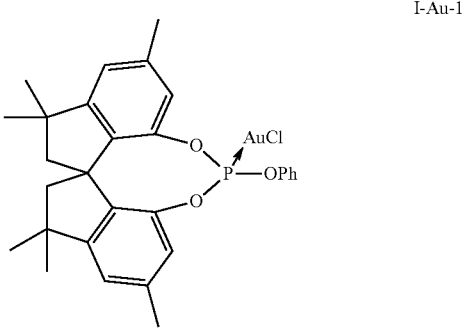

I-Au-2

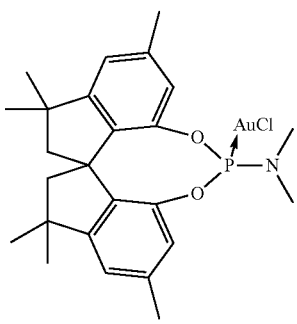

Example 10

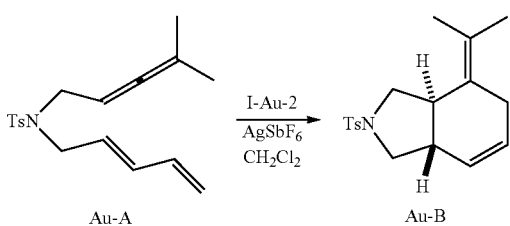

0.05 mmol AgSbF6 and 0.05 mmol I-Au-2 were mixed in 1 mL of dichloromethane, stirred at room temperature for 5 minutes, filtered to remove the insolubles, and then added to 5 mL dichloromethane containing 1 mmol Au-A. The mixture reacted with stirring at room temperature for 5 h, was then distilled to remove the solvent, and purified by column chromatography to obtain a product Au-B with a yield of 85%. NMR data of the product: $^1$H NMR (400 MHz, C6D6): δ 1.38 (s, 3H), 1.45 (s, 3H), 1.92 (s, 3H), 2.01 (m, 2H), 2.39 (d, J=20.3 Hz, 1H), 2.54 (d, J=20.3 Hz, 1H), 2.89 (dd, J=11.2 Hz, 9.1 Hz, 1H), 3.43 (dd, J=9.1, 11.2 Hz, 1H), 3.66 (dd, J=7.6, 9.1 Hz, 1H), 4.12 (dd, J=6.0, 9.2 Hz, 1H), 5.51 (bs, 2H), 6.85 (d, J=8.4 Hz, 2H), 7.86 (d, J=8.4 Hz, 2H).

Following a similar reaction process, replacing I-Au-2 with I-Au-1, a product Au-B was obtained in a yield of 93%.

Example 11

Synthesis of Tetramethyl Spiro Phosphite Ligand

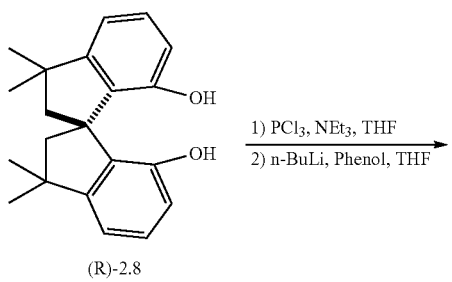

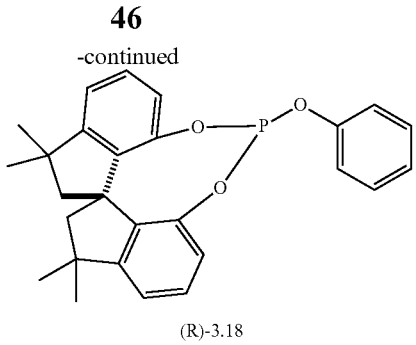

(R)-3.18

In a three-necked flask I, 1.54 g compound (R)-2.8 (5 mmol) was added, and under nitrogen protection, 30 mL ultra-dry tetrahydrofuran was added. The mixture was cooled to −78° C., 1.72 mL triethylamine (12 mmol) was added, and 2.75 mL of 2 mol/L PCl$_3$ solution (5.5 mmol) was added dropwise. After the addition, the temperature was raised to room temperature, the reaction was conducted for 3 hours, and a large amount of solid was formed during the reaction. 563 mg (6 mmol) of phenol was added to a three-necked flask II, the temperature was lowered to −78° C., 2 mL of 2.5 mol/L n-butyllithium was added dropwise, to react for 1 hour. The three-necked flask I was cooled to −78° C., and a lithium phenol solution was added dropwise to the reaction system. After the addition was completed, the temperature was raised to room temperature, and the reaction was allowed to proceed overnight. The reaction solution was directly concentrated, and then column chromatography was performed under nitrogen protection (eluent: ethyl acetate/petroleum ether=1/50) to give a product (R)-3.18, a white powdery solid. Characterization data: m.p. 100-102° C. $[α]^{20}_D$=145.4. $^1$H NMR (400 MHz, CDCl$_3$) δ 7.29-7.14 (m, 3H), 7.13-6.86 (m, 7H), 6.68 (d, J=7.9 Hz, 1H), 2.34 (d, J=12.5 Hz, 2H), 2.00 (d, J=12.5 Hz, 2H), 1.47 (d, J=11.0 Hz, 6H), 1.22 (d, J=8.3 Hz, 6H). $^{31}$P NMR (162 MHz, CDCl$_3$) δ 118.84.

Example 12

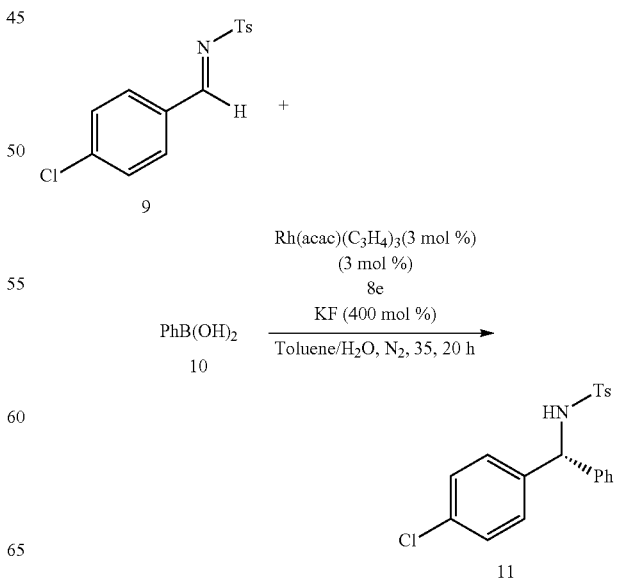

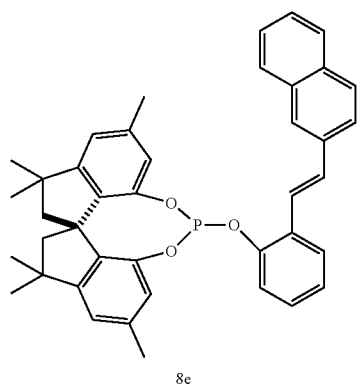

8e

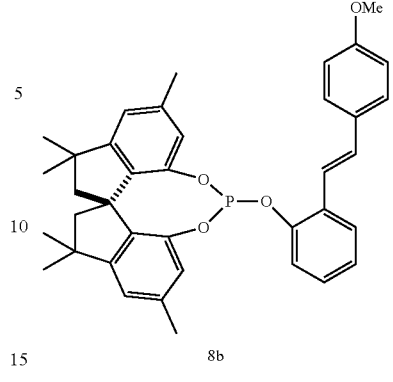

8b

Under nitrogen protection, Rh(acac)(C$_2$H$_4$)$_2$ (0.6 mg, 1.5 μmol) and 8e (0.9 mg, 1.5 μmol) were dissolved in toluene (0.5 mL), stirred at room temperature for 1 h, and then added sequentially with imine 9 (0.05 mmol) and phenylboronic acid (0.1 mmol), potassium fluoride (0.2 mmol) and water (0.5 mL). The reaction mixture was stirred at 35° C. for 20 h. After the reaction was completed, a product 11 was purified by column chromatography, with a yield of 85%, and an enantiomeric excess value of 99% ee.

(R)—N-((4-chlorophenyl)(phenyl)methyl)-4-methyl-benzenesulfonamide(11)

m.p. 118-120° C.; HPLC analysis: Chiralpak OD-H (hexane/i-PrOH=93/7, 0.8 mL/min, 230 nm), t$_R$ (minor) 21.899 min, t$_R$ (major) 30.665 min; [α]$_D^{20}$=+28.5 (c 0.23, CH$_2$Cl$_2$); H NMR (400 MHz, CDCl$_3$) δ 7.55 (d, J=8.3 Hz, 2H), 7.21 (m, 2H), 7.16 (m, 4H), 7.09-7.01 (m, 4H), 5.53 (d, J=7.1 Hz, 1H), 5.18-5.16 (m, 1H), 2.39 (s, 3H).

Example 13

Under nitrogen protection, [RhCl(C$_2$H$_4$)$_2$]$_2$ (0.3 mg, 0.75 μmol) and 8b (0.9 mg, 1.5 μmol) were dissolved in toluene (0.5 mL), stirred at room temperature for 1 h, and then added sequentially with imine 12 (0.05 mmol) and phenylboronic acid (0.1 mmol), potassium fluoride (0.2 mmol) and water (0.5 mL). The reaction mixture was stirred at 25° C. for 20 h. After the reaction was completed, a product 13 was purified by column chromatography, with a yield of 90% and an enantiomeric excess value of 98% ee.

(S)-4-phenyl-3,4-dihydrobenzo[e][1,2,3]oxathiazine 2,2-dioxide(13)

m.p. 133-134° C.; 98% ee; HPLC analysis: Chiralpak IC-3 (hexane/i-PrOH=90/10, 0.8 mL/min, 220 nm), t$_R$ (minor) 14.606 min, t$_R$ (major) 16.956 min; [α]$_D^{20}$=−25.7 (c 0.10, CH$_2$Cl$_2$); $^1$H NMR (400 MHz, CDCl$_3$) δ7.44-7.42 (m, 3H), 7.38-7.28 (m, 3H), 7.14-7.04 (m, 2H), 6.82 (d, J=7.8 Hz, 1H), 5.90 (s, 1H), 4.77 (s, 1H).

Example 14

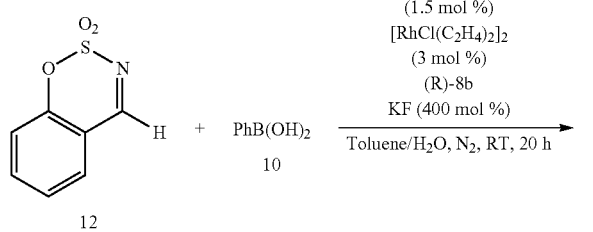

12

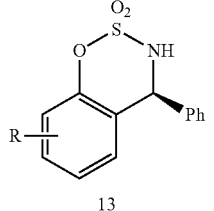

13

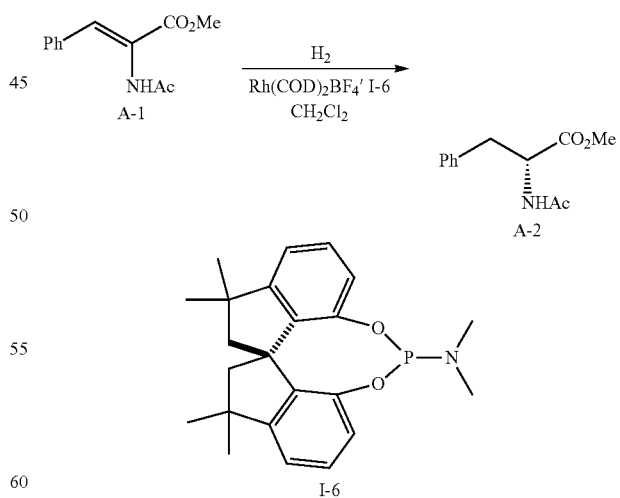

After 0.03 mmol of [Rh(COD)$_2$BF$_4$] and 0.065 mmol of I-6 were complexed in 10 mL of dichloromethane for 30 minutes, 10 mL of dichloromethane containing 5 mmol of A-1 was injected, and a reduction reaction was conducted at room temperature while maintaining H$_2$ pressure at one standard atmospheric pressure. After 48 h, the reaction was ended, and a 100% product A-2 was obtained after purification with 97% ee.

Example 15

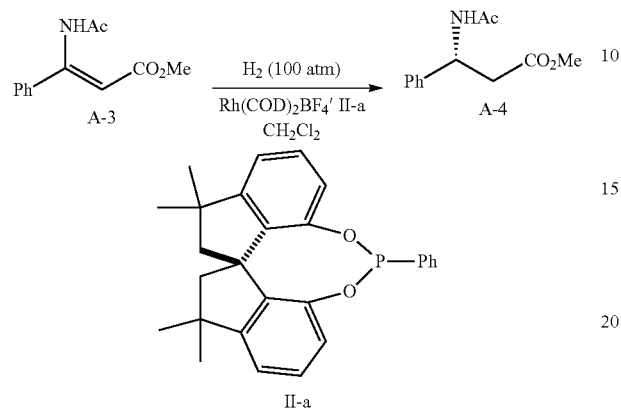

After 0.03 mmol of [Rh(COD)₂BF₄] and 0.065 mmol of II-a were complexed in 10 mL of dichloromethane for 60 minutes, 10 mL of dichloromethane containing 5 mmol of A-3 was injected, and a reduction reaction was conducted at room temperature while maintaining H₂ pressure at 100 atm. After 60 h, the reaction was ended, and a 100% product A-4 was obtained after column purification with 95% ee.

Example 16

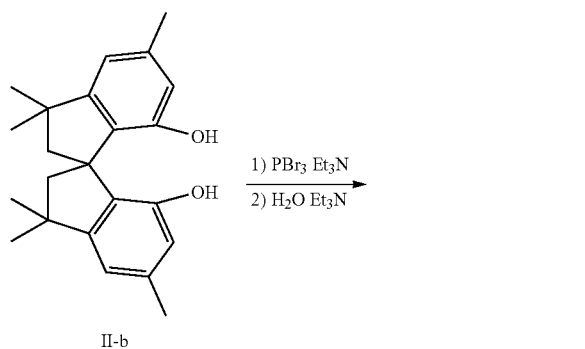

1 mmol of II-b and 1 mmol of phosphorus tribromide were mixed in 20 mL of ultra-dry dichloromethane, and added with 2 mmol of triethylamine dropwise to react at room temperature for 6 h. Then, 5 mL of water and 3 mmol of triethylamine were added, and the reaction continued for 12 hours. The reaction system was washed with brine, dried over sodium sulfate, desolvated, and purified by column chromatography to obtain I'-b-1 with a yield of 58%.

Example 17

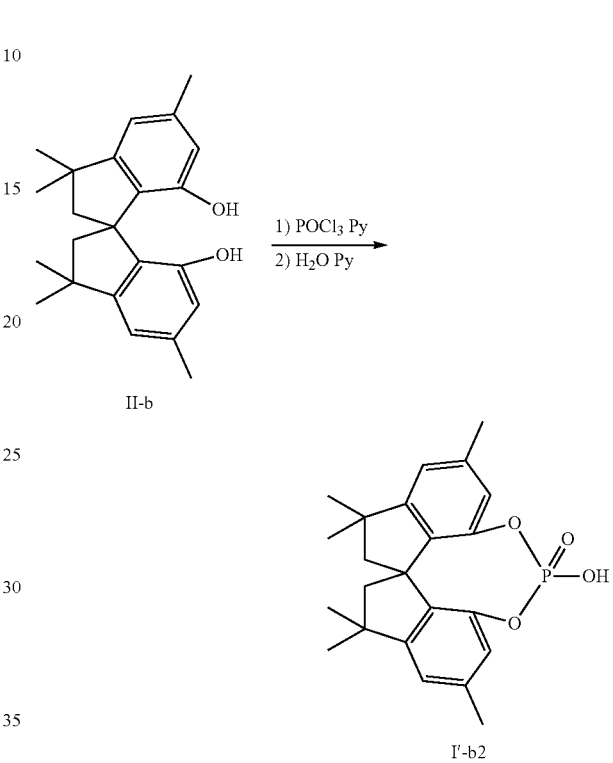

In a reaction flask, II-b (2.3 mmol) and 18 mL pyridine were added and cooled to 0° C., and POCl₃ (4.6 mmol) was carefully added dropwise. After the addition, the temperature was raised to room temperature, and the system was heated then to 70° C. to react for 3 h. The reaction solution was placed in an ice bath to be cooled to 0° C., and left open for 10 minutes, then 18 mL of water was slowly added dropwise along the wall of the tube, and an appropriate amount (2 mL) of dichloromethane was added to facilitate dissolving. The reaction solution was stirred for 5 minutes and then raised to 110° C. to react for 4 h. After the reaction was completed, the reaction solution was cooled to room temperature, added with dichloromethane to be clear, added with 5M hydrochloric acid, and stirred for 20 minutes to remove pyridine as much as possible. Extraction was performed with dichloromethane, and the dichloromethane layers were combined, washed with 5M hydrochloric acid for 3 times, washed with saturated NaCl, dried over anhydrous NaSO₄, concentrated, and subjected to silica gel column chromatography (elutes: ethyl acetate/petroleum ether=2:1-ethyl acetate/methanol=20:1). The product obtained after concentration was dissolved in dichloromethane, washed twice with 5M hydrochloric acid, concentrated after separation, added with toluene to spin to remove water, and dried by evacuation to obtain a product I'-b-2 with a yield of 85%.

According to a similar process as described above, the fed spirobiphenol was changed to prepare spiro phosphoric acids with the following structures:

I'-b3

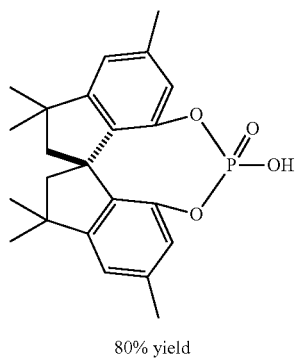

80% yield

I'-b4

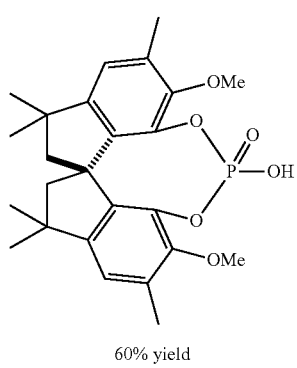

60% yield

I'-b5

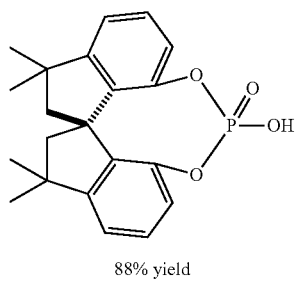

88% yield

I'-b6

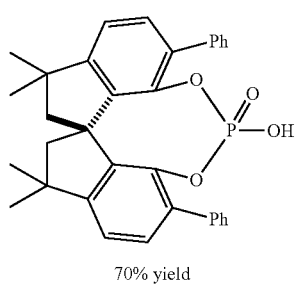

70% yield

Example 18

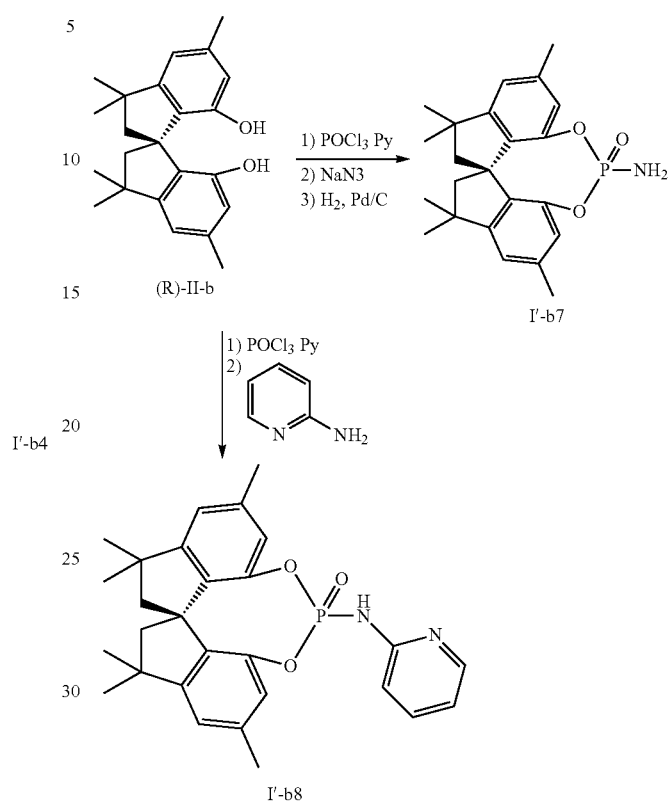

(R)-II-b (2.3 mmol) and 18 mL pyridine were added to a reaction flask and cooled to 0° C., and POCl$_3$ (4.6 mmol) was carefully added dropwise. The temperature was raised to room temperature after the addition, and then the reaction solution was heated to 70° C. to react for 3 h. The reaction solution was placed in cold water, added with dichloromethane to be clear, added 5M hydrochloric acid, and stirred for 20 minutes to remove pyridine as much as possible. Extraction was performed with dichloromethane, and the dichloromethane layers were combined, washed with 5M hydrochloric acid for 3 times, washed with saturated NaCl, dried over NaSO$_4$, concentrated, and subjected to silica gel column chromatography to obtain a spirophosphinic chloride intermediate. 0.5 mmol of the spirophosphinic chloride intermediate was weighed, and 1 mmol of sodium azide and 5 mL of acetone were added thereto, reacted at room temperature for 12 h, added with 20 mL of water, extracted with 20 mL of dichloromethane, dried over anhydrous NaSO$_4$, concentrated, and subjected to silica gel column chromatography to obtain a spirocyclic phosphono azide intermediate; the latter was dissolved in 10 mL of tetrahydrofuran, added with 0.05 g of palladium carbon, hydrogenated at atmospheric pressure for 12 h until the raw material disappeared, and filtered, and the filtrate was concentrated and then subjected to silica gel column chromatography to obtain phsophonamidate (R)-I'-b-7 with a total yield of 55%.

0.5 mmol of the above spirophosphonyl chloride intermediates was weighed, 0.05 mmol of 4-dimethylaminopyridine and 0.6 mmol of o-aminopyridine were added thereto, and 5 mL of ultra-dry dichloromethane was added. The reaction was conducted for 24 h, added with 30 mL of water, and extracted with 20 mL of dichloromethane, dried with anhydrous NaSO₄, concentrated and subjected to silica gel column chromatography to obtain spirocyclic phosphonic amino pyridine (R)-I'-b-8, with a total yield of 50%.

Following a similar preparation process as described above, a compound (±)-I'-b-7 was obtained with a total yield of 60%.

Example 19

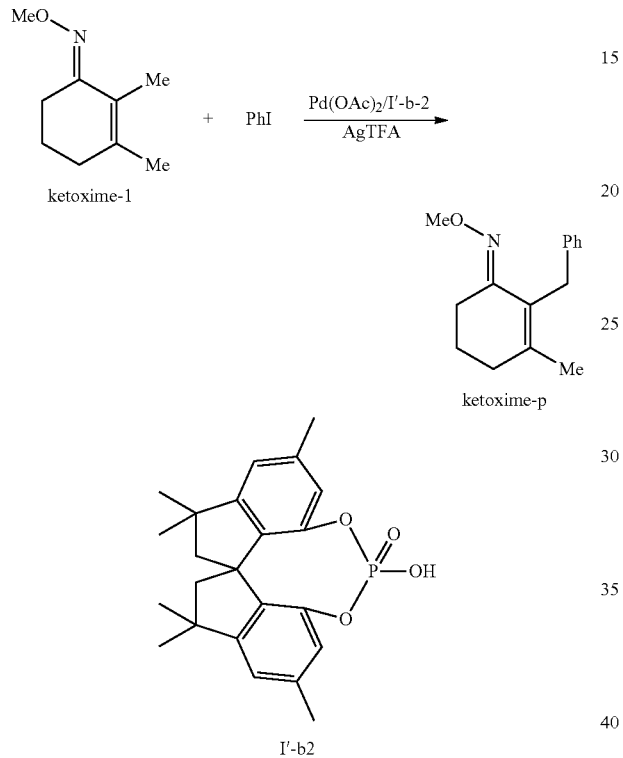

ketoxime-1 ketoxime-p

I'-b2

Under nitrogen protection, Pd(OAc)2 (0.1 mmol, 22 mg), and I'-b-2 (0.2 mmol), AgTFA (4 mmol, 886 mg), ketoxime-1 (2 mmol) and iodobenzene (4 mmol) were dissolved in 10 mL of trifluoromethylbenzene, reacted at 85° C. for 16 h, cooled to room temperature, desolvated under reduced pressure, and then subjected to column chromatography (petroleum ether/ethyl acetate 200/1 to 100/1) to obtain ketoxime-2, with a yield of 90%, ¹H NMR (400 MHz, CDCl₃) δ 7.29-7.20 (m, 5H), 3.84 (s, 3H), 3.77 (s, 2H), 2.55-2.48 (m, 2H), 2.17 (t, J=6.1 Hz, 2H), 1.84 (s, 3H), 1.76-1.66 (m, 2H).

Example 20

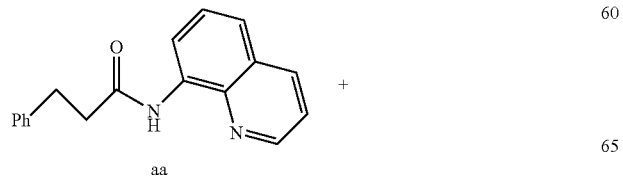

aa

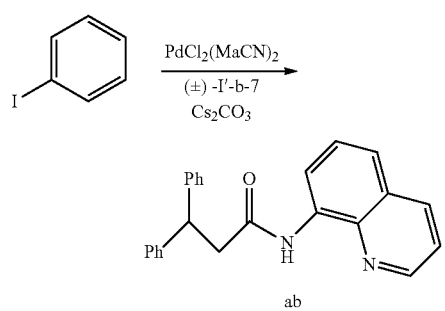

ab

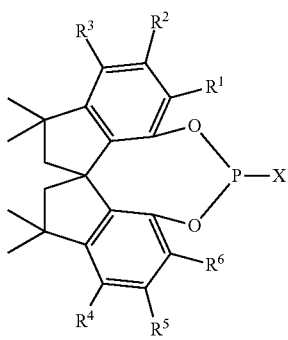

(±) -I'-b-7

Under nitrogen protection, the amide aa (0.20 mmol), iodobenzene (0.40 mmol), PdCl₂(CH₃CN)₂ (5.2 mg, 0.020 mmol), a ligand (±)-I'-b-7 (0.040 mmol), and cesium carbonate (97.7 mg, 0.30 mmol) were dissolved in 0.5 mL of p-xylene, stirred at room temperature for 15 min, then stirred at 140° C. for 14 h, cooled, and subjected to column chromatography [Petroleum Ether, ethyl acetate (v/v=10:1)] to give the product ab, with a yield of 90%.

What is claimed is:

1. A 3,3,3',3'-tetramethyl-1,1'-spirobiindane-based monophosphine ligand, being a compound represented by formula I or formula I', or an enantiomer, a raceme or a diastereoisomer thereof:

I

-continued

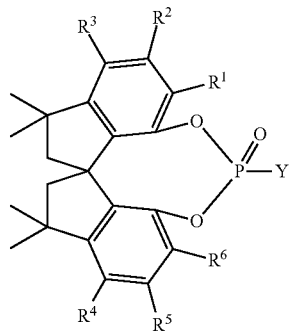

I'

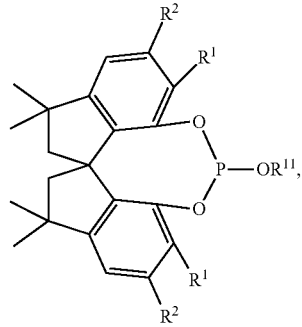

I-B wherein in formula I and formula I': $R^1$ and $R^6$ are each independently selected from the group consisting of hydrogen, $C_1$-$C_{10}$alkyl or perfluoroalkyl, $C_3$-$C_6$ cycloalkyl, and $C_1$-$C_4$ alkoxy or perfluoroalkoxy, unsubstituted or substituted aryl; and $R^2$, $R^3$, $R^4$, and $R^5$ are each independently selected from the group consisting of hydrogen, halogen, $C_1$-$C_{10}$alkyl or perfluoroalkyl, $C_3$-$C_6$ cycloalkyl, and $C_1$-$C_4$ alkoxy or perfluoroalkoxy, wherein in formula I: X is selected from the group consisting of arylvinylphenyl, aryloxy, arylvinylphenoxy, and $NR^7R^8$; $R^7$ and $R^8$ are each independently selected from the group consisting of $C_1$-$C_4$ alkyl, arylmethylene, and arylmethylmethenyl; and wherein in formula I': Y is hydroxyl or $NHR^9$, $R^9$ is hydrogen.

2. The 3,3,3',3'-tetramethyl-1,1'-spirobiindane-based monophosphine ligand according to claim 1, being a phosphonite ligand represented by formula I-A or an enantiomer thereof:

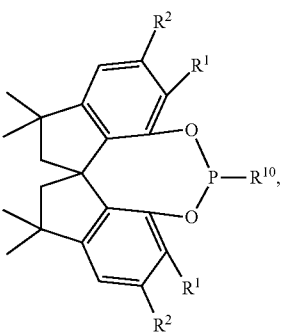

I-A wherein in the formula I-A: $R^1$ is selected from the group consisting of hydrogen, $C_1$-$C_{10}$alkyl or perfluoroalkyl, $C_3$-$C_6$ cycloalkyl, and $C_1$-$C_4$ alkoxy or perfluoroalkoxy; $R^2$ is hydrogen or $C_1$-$C_4$ alkyl; and $R^{10}$ is arylvinylphenyl.

3. The 3,3,3',3'-tetramethyl-1,1'-spirobiindane-based monophosphine ligand according to claim 1, being a phosphite ligand represented by formula I-B or an enantiomer thereof:

wherein in formula I-B: $R^1$ is selected from the group consisting of hydrogen, $C_1$-$C_{10}$ alkyl or perfluoroalkyl, $C_3$-$C_6$ cycloalkyl, and $C_1$-$C_4$ alkoxy or perfluoroalkoxy; $R^2$ is hydrogen or $C_1$-$C_4$ alkyl; and $R^{11}$ is represented by a structural formula I-BB:

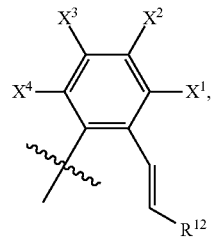

I-BB wherein in formula IBB: $X^1$-$X^4$ are each selected from the group consisting of hydrogen, $C_1$-$C_{10}$alkyl or perfluoroalkyl, $C_3$-$C_6$ cycloalkyl, and $C_1$-$C_4$ alkoxy or perfluoroalkoxy; $R^{12}$ is aryl or $C_5$-$C_{14}$ heteroaryl.

4. The 3,3,3',3'-tetramethyl-1,1'-spirobiindane-based monophosphine ligand according to claim 1, being a phosphite ligand represented by formula I-C or an enantiomer thereof:

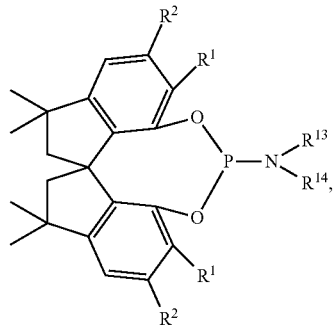

I-C wherein in formula I-C: $R^1$ is selected from the group consisting of hydrogen, $C_1$-$C_{10}$ alkyl or perfluoroalkyl, $C_3$-$C_6$ cycloalkyl, and $C_1$-$C_4$ alkoxy or perfluoroalkoxy, arylmethyleneoxy, unsubstituted or substituted aryl, and unsubstituted or substituted heteroaryl;
$R^2$ is hydrogen or $C_1$-$C_4$ alkyl; and
$R^{13}$ and $R^{14}$ are each independently selected from the group consisting of $C_1$-$C_4$ alkyl, arylmethylene, and arylmethylmethenyl.

5. A synthesis method of the compound presented by formula 1 according to claim 1, the synthesis method comprising:

preparing a compound represented by formula I through a substitution reaction of a compound presented by formula II, as a raw material, with substituted phosphoric dichloride Cl₂P—X under an alkali, according to the following reaction scheme:

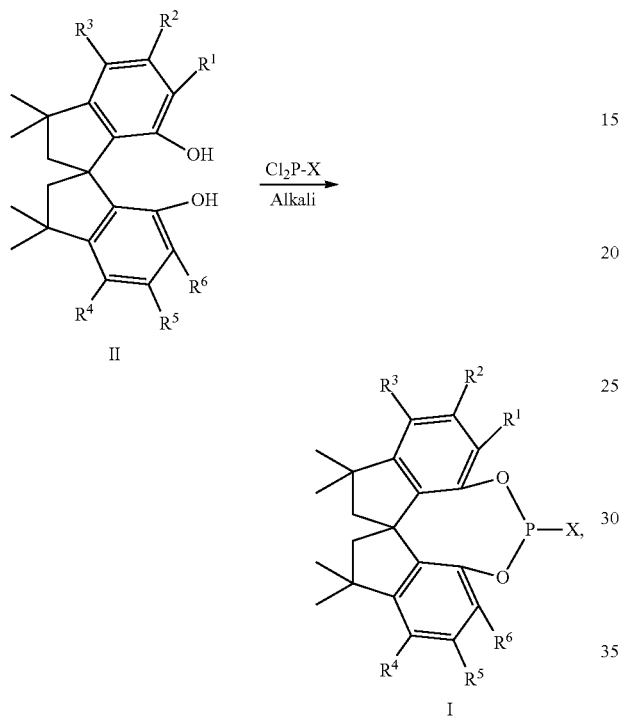

wherein in the formulas: R¹-R⁶ are the same as those defined in claim 1; X is selected from the group consisting of arylvinylphenyl, and NR⁷R⁸; and R⁷ and R⁸ are the same as those defined in claim 1; or preparing a compound represented by formula II-I through a substitution reaction of the compound represented by formula II, as a raw material, with phosphorus trichloride under an alkali, and then preparing the compound represented by formula I through a reaction of the compound represented by formula II-I with HX and an alkali, according to the following reaction scheme:

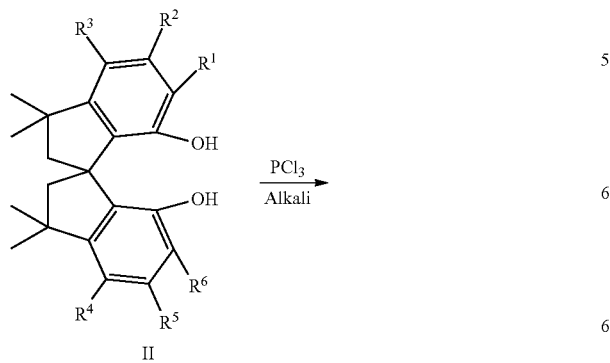

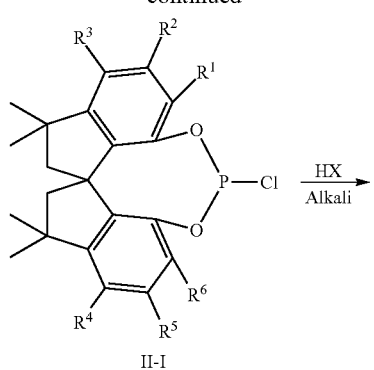

wherein in the formulas: R¹-R⁶ are the same as those defined in claim 1; X is selected from the group consisting of aryloxy, arylvinylphenoxy, and NR⁷R⁸; and R⁷ and R⁸ are the same as those defined in claim 1.

6. A synthesis method of the compound represented by formula I' according to claim 1, the synthesis method comprising:

preparing a compound represented by formula II-I' through a substitution reaction of the compound presented by formula II, as a raw material, with phosphorus oxychloride, and then preparing the compound represented by formula I' through a hydrolysis of the compound represented by formula II-I', according to the following reaction scheme:

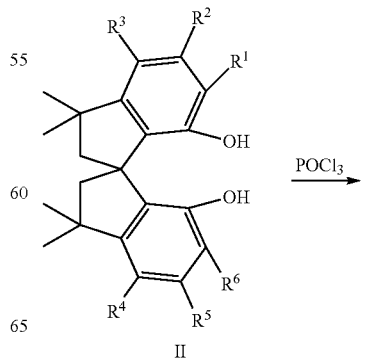

-continued

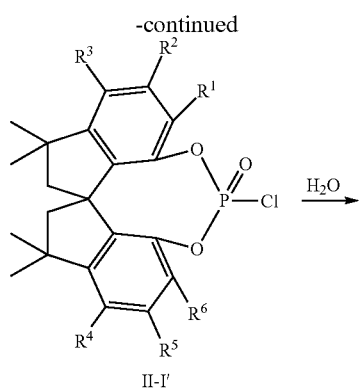

II-I'

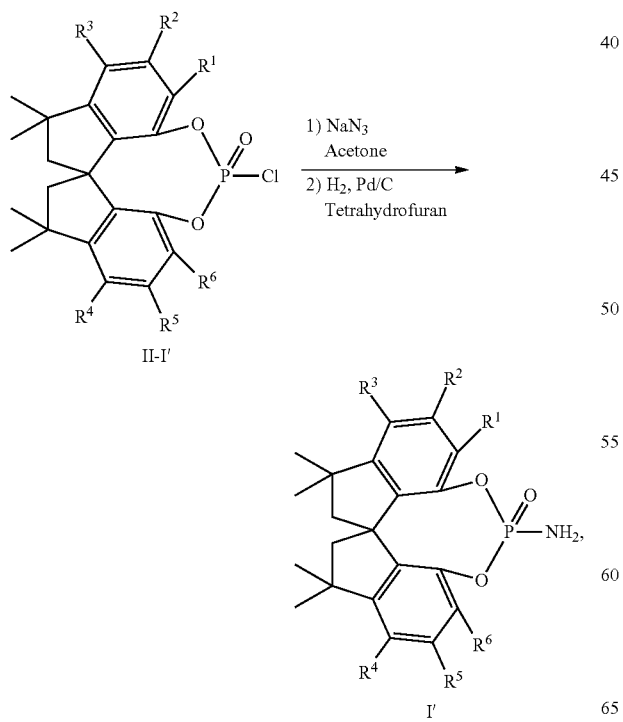

wherein in the formulas: $R^1$-$R^6$ are the same as those defined in claim 1; or
preparing the compound represented by formula I' through a substitution reaction and a reduction reaction of the compound represented by formula II-I' with sodium azide, according to the following reaction scheme:

wherein in the formulas: $R^1$-$R^6$ are the same as those defined in claim 1.

7. The 3,3,3',3'-tetramethyl-1,1'-spirobiindane-based monophosphine ligand according to claim 1, wherein the compound represented by formula I is selected from the group consisting of the following compounds and an enantiomer thereof:

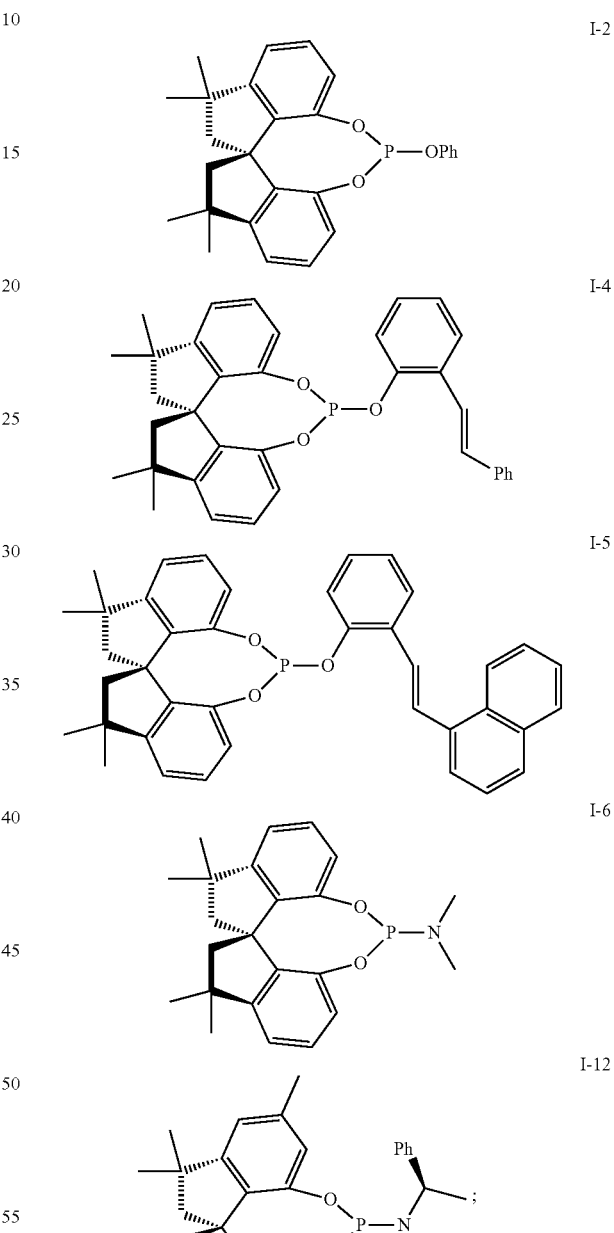

and
wherein the compound represented by formula I' is selected from the group consisting of the following compounds and an enantiomer thereof:

I'-4
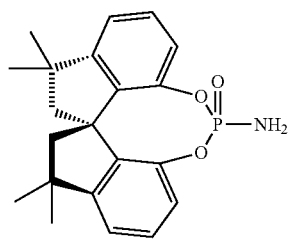
I'-6
I'-7
I'-8
I'-9
I'-10
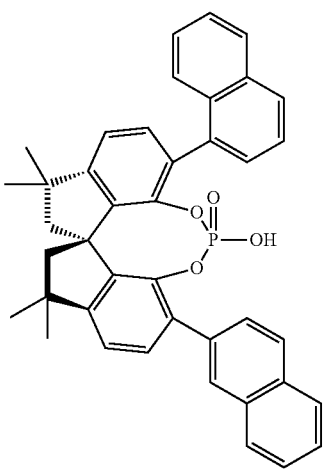
I'-11
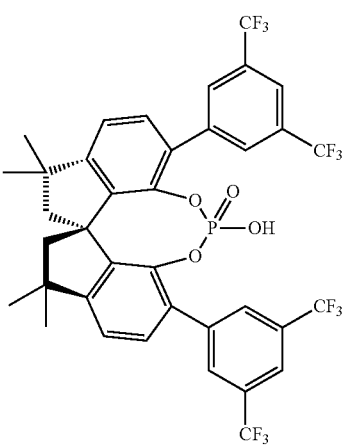
I'-12
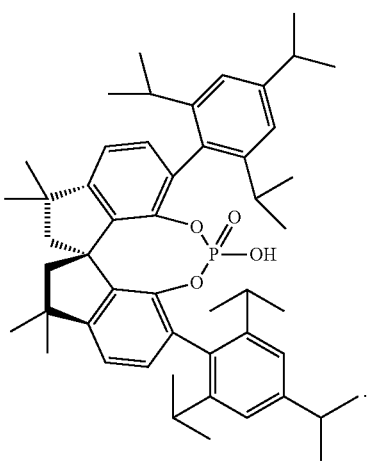
* * * * *